US010246048B2

(12) United States Patent
Liteplo et al.

(10) Patent No.: US 10,246,048 B2
(45) Date of Patent: Apr. 2, 2019

(54) DIRECT LOCKING RETRACTOR ASSEMBLY FOR A SEATBELT SYSTEM AND A METHOD FOR ACTUATING THE SAME

(71) Applicant: TOOL, INC., Marblehead, MA (US)

(72) Inventors: William P. Liteplo, Middleton, MA (US); Jason G. Sidman, Marblehead, MA (US); Arnold J. Herberg, Davisburg, MI (US); John D. Fiegener, Marblehead, MA (US); Daniel Bloch, Boston, MA (US); Ryan Thompson, Cambridge, MA (US); Michael D. Tinstman, Malden, MA (US); Ben Bangser, Salem, MA (US); Thomas Gernetzke, Beverly, MA (US); Daniel L. Ha, McLean, VA (US); Matthew P. Cioe, Mansfield, MA (US)

(73) Assignee: Tool, Inc., Marblehead, MA (US)

( * ) Notice: Subject to any disclaimer, the term of this patent is extended or adjusted under 35 U.S.C. 154(b) by 67 days.

(21) Appl. No.: 15/256,051

(22) Filed: Sep. 2, 2016

(65) Prior Publication Data
US 2017/0066404 A1  Mar. 9, 2017

Related U.S. Application Data

(60) Provisional application No. 62/215,427, filed on Sep. 8, 2015.

(51) Int. Cl.
*B60R 22/347* (2006.01)
(52) U.S. Cl.
CPC ................................. *B60R 22/347* (2013.01)

(58) Field of Classification Search
CPC .................................................... B60R 22/347
See application file for complete search history.

(56) References Cited

U.S. PATENT DOCUMENTS

| 3,294,447 A | 12/1966 | Riley |
| 3,323,831 A | 6/1967 | Buechler |
| 4,305,618 A | 12/1981 | Molnar |
| 4,427,164 A | 1/1984 | Rumpf |
| 4,664,413 A | 5/1987 | Sato |
| 4,733,886 A | 3/1988 | Yokote |
| 4,856,727 A | 8/1989 | Schmidt et al. |

(Continued)

FOREIGN PATENT DOCUMENTS

GB         1311978         3/1973

*Primary Examiner* — Paul N Dickson
*Assistant Examiner* — Joselynn Y Sliteris
(74) *Attorney, Agent, or Firm* — Sand, Sebolt & Wernow Co., LPA

(57) ABSTRACT

A seatbelt system comprising a buckle; a spool with a ratchet wheel and webbing that is windable onto or off of the spool as the spool rotates. A control mechanism is operatively engaged with a pawl located proximate the ratchet wheel. When the control mechanism is in a first condition, the pawl is disengaged from the ratchet wheel and the ratchet wheel and spool are rotatable to wind the webbing onto or off of the spool. When the control mechanism is in a second condition, the pawl is moved into engagement with the ratchet wheel and the ratchet wheel and spool are only able to rotate the webbing onto the spool. The control mechanism includes a button that has to be pushed by a user after the seatbelt is engaged with the buckle in order to move the pawl into engagement with the ratchet wheel.

19 Claims, 21 Drawing Sheets

(56) References Cited

U.S. PATENT DOCUMENTS

| | | |
|---|---|---|
| 4,893,874 A | 1/1990 | Childress et al. |
| 4,935,994 A | 6/1990 | Boone et al. |
| 5,023,980 A | 6/1991 | Thomas |
| 5,050,274 A | 9/1991 | Staniszewski et al. |
| 5,058,244 A | 10/1991 | Fernandez |
| 5,192,035 A | 3/1993 | Dufour |
| 5,286,084 A | 2/1994 | Bart |
| 5,484,190 A | 1/1996 | Corrion et al. |
| 5,529,381 A | 6/1996 | Zhao et al. |
| 5,553,804 A | 9/1996 | Hamann |
| 5,649,341 A | 7/1997 | Ashline et al. |
| 5,806,148 A | 9/1998 | McFalls et al. |
| 5,870,816 A | 2/1999 | McFalls et al. |
| 7,010,836 B2 | 3/2006 | Acton et al. |
| 7,185,919 B2 | 3/2007 | Mather et al. |
| 7,871,132 B2 | 1/2011 | Rogers |
| 8,052,220 B2 | 11/2011 | Dennis et al. |
| 8,087,696 B2 | 1/2012 | Mather et al. |
| 8,322,000 B2 | 12/2012 | Dziengowski et al. |
| 8,382,160 B2 | 2/2013 | Disley et al. |
| 2009/0048739 A1 | 2/2009 | Midorikawa |

DIRECT LOCKING RETRACTOR ASSEMBLY FOR A SEATBELT SYSTEM AND A METHOD FOR ACTUATING THE SAME

CROSS-REFERENCE TO RELATED APPLICATIONS

This application claims the benefit of U.S. Provisional Patent Application Ser. No. 62/215,427, filed Sep. 8, 2015, the entire disclosure of which is incorporated herein by reference.

BACKGROUND OF THE INVENTION

Technical Field

This invention relates generally to seatbelts. More particularly, this invention is directed to seatbelts that might be used to secure a child seat in place. Specifically, the invention relates to a direct or manual locking retractor assembly that is only able to be actuated after a locking tongue on the seatbelt webbing has been interlockingly engaged in a buckle assembly and a control mechanism has subsequently and purposefully been activated by a user.

Background Information

Federal law in the United States requires that passenger seats in a vehicle be provided with a seatbelt system where a lap belt portion of the system is lockable. The lap belt portion is utilized to secure a child seat to vehicle seats in a safe, secure manner. These seatbelt systems are known as Automatic Locking Retractors (ALR).

The typical manner of securing a seatbelt in place with an ALR type seatbelt system requires that the user place the child seat on the car seat in the desired orientation and then slowly and steadily pull the seatbelt webbing out of its housing until no further webbing can be withdrawn therefrom. The user then has to carefully thread the locking tongue that is provided on the webbing through a specially provided seatbelt channel on the child seat. The locking tongue is then inserted into the seatbelt buckle. The user then has to manually take up sufficient slack in the webbing so that the child seat is snugly and firmly retained against the vehicle's seat. This is accomplished by feeding the webbing back into the housing while pushing downwardly on the child seat. When each section of webbing being fed into the housing is released, the ALR automatically works to prevent any part of the webbing from being withdrawn once again from the seatbelt housing. According to guidelines, the webbing has to be fed back into the housing up until the point that the child seat will not tend to move more than one inch to the left or right or one inch to the front or back when manipulated by the adult performing the installation.

While ALR systems work well to secure a child seat to a vehicle seat, these systems have some unforeseen issues. There have been a number of incidents over the past few years where children in the rear seat of a vehicle while playing with a seatbelt have accidentally activated the ALR mode of the seatbelt and have become tightly entangled therein. In some instances, the entanglements have been severe enough to require cutting of the seatbelt in order to release the child. These types of entanglements have been particularly prevalent in instances where the seatbelt is being misused, i.e., not being used properly. Even adults have accidentally triggered ALR systems with similar results.

Another issue with presently known ALR systems is that they require that substantially the entire webbing be withdrawn from the seatbelt assembly in order to activate the retractor mechanism. In some instances the user will not realize the ALR system has not been activated or they may not even know that the system needs to be activated and, consequently, the child seat installed with the seatbelt may not be adequately secured in place. So, the seatbelt may not lock properly and therefore any seat secured thereby will tend to be loose and therefore not safe for use. In addition to this, a new weight limit for child seats secured by LATCH went into effect in February 2014 limiting the combined weight of the seat and child to 65 pounds. LATCH systems secure the child seat to a specially installed seatbelt tethers that are anchored on the vehicle's frame. Because of the new weight limit, young children may need to be moved out of their tethered child seats and into regular seatbelts. However, this may pose a safety hazard because of where the seatbelts may contact smaller children. Parents may want to use a child seat for that child but since the tether cannot be utilized, the seatbelt is the only option for securing the child seat in place.

SUMMARY

It would be desirable to have a locking retractor mechanism in a vehicle that cannot and will not be accidentally activated by anyone sitting in a vehicle seat, particularly in a seat in a rear part of a vehicle. It would further be desirable to be able to use a single seatbelt in two different ways. The first way would be to use the seatbelt to buckle a person directly into the seat; where that seatbelt would be able to allow the person to bend and move freely in the seat without locking up and preventing further motion of the seatbelt. The second way would be to use the seatbelt to secure a child seat in place. In this instance the seatbelt may be threaded through the child seat without having to be completely unwound from the seatbelt assembly to activate the locking retractor mechanism. Furthermore, the seatbelt would desirably be able to be cinched or tightened to keep the child seat in place and movement of the seatbelt out of the seatbelt housing would be prevented while still permitting slack webbing to be taken up into the housing.

It is therefore an objective to provide a locking retractor mechanism that is only engageable when a child seat is being secured in the vehicle.

It is a further objective to provide a locking retractor mechanism that is quickly and easily activated when installing a child seat and without requiring that the entire webbing be unwound from a seatbelt housing to activate the system.

It is a further object of the invention to provide a locking retractor mechanism that requires a purposeful decision on the part of the user to activate a cinching mechanism to install a child seat but which is also simple to use once that decision has been made. It is a further object of the invention to indicate to a user that the locking retractor mechanism has not been activated by the fact that the seatbelt is not able to be cinched until an actuator assembly has been engaged.

It is a further object of the invention to provide a locking retractor mechanism that does not interfere with Emergency Locking Retractors (ELR) in a vehicle seatbelt.

It is a further object of the invention to provide a locking retractor mechanism that has a substantially lower risk of entrapment of a vehicle occupant when the system is misused.

It is a further object of the invention to provide a locking retractor mechanism that does not pose additional risks to the vehicle's occupants while solving issues with previously known systems.

A seatbelt system comprising a buckle; a spool with a ratchet wheel and webbing that is windable onto or off of the spool as the spool rotates. A control mechanism is operatively engaged with a pawl located proximate the ratchet wheel. When the control mechanism is in a first condition, the pawl is disengaged from the ratchet wheel and the ratchet wheel and spool are rotatable to wind the webbing onto or off of the spool. When the control mechanism is in a second condition, the pawl is moved into engagement with the ratchet wheel and the ratchet wheel and spool are only able to rotate the webbing onto the spool. The control mechanism includes a button that has to be pushed by a user after the seatbelt is engaged with the buckle in order to move the pawl into engagement with the ratchet wheel.

In one aspect, the invention may provide a seatbelt system comprising a buckle assembly; a spool; a length of webbing having a first end engaged with the spool, a locking tongue provided on the webbing and wherein the locking tongue is selectively engageable in the buckle assembly; a ratchet wheel operatively engaged with the spool, said ratchet wheel and spool being selectively rotatable in unison about an axis in a first direction to wind the webbing onto the spool and in a second direction to wind the webbing off of the spool; a pawl configured to stop rotation of the ratchet wheel in one direction and thereby to stop rotation of the spool; and a control mechanism operatively engaged with the pawl, said control mechanism being movable between a first condition and a second condition; and when the control mechanism is in the first condition the pawl is disengaged from the ratchet wheel and the ratchet wheel and spool are rotatable in either of the first and second directions; and when the control mechanism is in the second condition the pawl is moved into engagement with the ratchet wheel and the ratchet wheel and spool are only able to rotate in the first direction.

In another aspect, the invention may provide a method of securing a child seat to a vehicle seat using a seatbelt mounted for rotation on a spool; said method comprising providing a seatbelt assembly that includes a seatbelt webbing connected at one end to a spool, where the spool is rotatable about an axis in a first direction to wind the webbing on the spool and is rotatable in a second direction to wind the webbing off of the spool; providing a ratchet wheel that is rotatable in unison with the spool; providing a pawl proximate the ratchet wheel; actuating a control mechanism operatively engaged with the pawl; moving the pawl into engagement between two teeth on the ratchet wheel; stopping, with the pawl, rotation of the ratchet wheel in the second direction while permitting rotation of the ratchet wheel in the first direction.

In another aspect the invention may provide a method of using a seatbelt in a vehicle comprising providing a seatbelt assembly that includes a seatbelt webbing connected at one end to a spool, where the spool is rotatable about an axis in a first direction to wind the webbing on the spool and is rotatable in a second direction to wind the webbing off of the spool; providing a ratchet wheel that is rotatable in unison with the spool; providing a pawl proximate the ratchet wheel; providing a control mechanism operatively engaged with the pawl; and selecting one of a first mode or a second mode with which to use the seatbelt assembly; where the first mode does not permit cinching of the seatbelt webbing and the second mode does permit cinching of the seatbelt webbing. The step of selecting the first mode includes engaging a locking tongue on the seatbelt webbing in a buckle assembly provided on the vehicle. The step of selecting the second mode includes engaging the locking tongue in the buckle assembly followed by engaging the control mechanism to move the pawl into contact with the ratchet wheel and stopping rotation of the ratchet wheel and thereby the spool with the pawl. The method further comprises the step of stopping the use of the seatbelt assembly in the selected one of the first mode or the second mode by disengaging the locking tongue from the buckle assembly.

BRIEF DESCRIPTION OF THE SEVERAL VIEWS OF THE DRAWINGS

A sample embodiment of the invention is set forth in the following description, is shown in the drawings and is particularly and distinctly pointed out and set forth in the appended claims.

Similar numbers refer to similar parts throughout the drawings.

DETAILED DESCRIPTION

Figure 1:
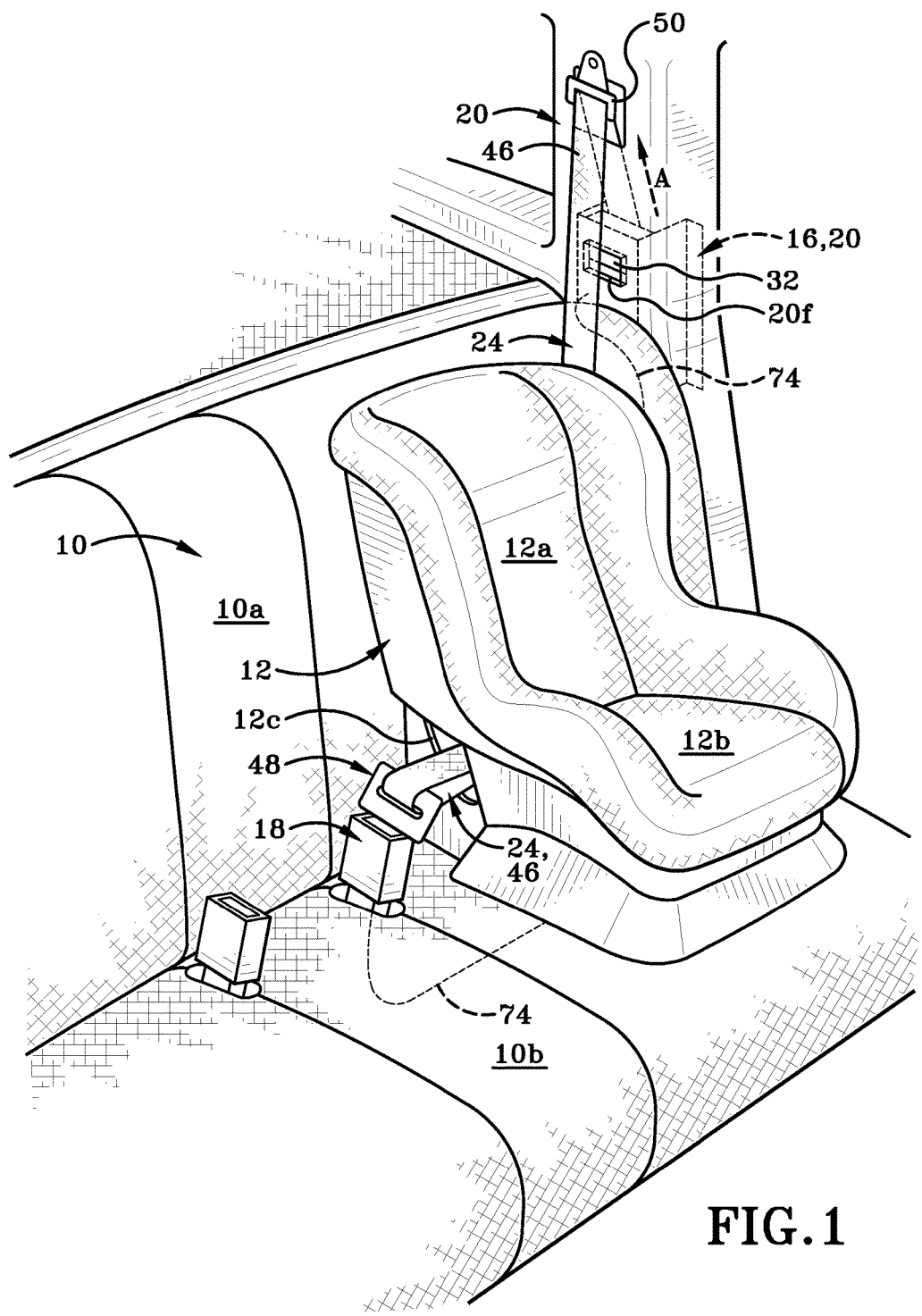
FIG. 1 is a isometric perspective view of a vehicle's rear seat showing a child seat positioned thereon and a seatbelt system in accordance with an aspect of the invention being provided to secure the child seat in place.

Referring to FIG. 1, there is shown a rear seat 10 of a vehicle. Seat 10 has a back region 10a and a seat region 10b. A child seat 12 is illustrated as being positioned on seat 10 with a back 12a of child seat 12 positioned against back region 10b and a seat 12b of child seat 12 positioned on seat region 10b. Child seat 12 is illustrated as being in a forward-facing orientation by way of example only. It will be understood that child seat 12 may be oriented in a rear-facing orientation instead. A seatbelt channel 12c is defined in phantom in child seat 12.

A seatbelt system in accordance with the present invention is illustrated in FIG. 1. Seatbelt system is indicated by the reference number 14 (FIG. 2) and includes a seatbelt assembly 16 and a buckle assembly 18. Each of the seatbelt assembly 16 and buckle assembly 18 will be described in greater detail below. Seatbelt assembly 16 may be mounted on vehicle in any one of a number of different locations. For instance, seatbelt assembly 16 may be ceiling mounted, shelf mounted, pillar mounted, or mounted on the seat itself. By way of example only, a pillar mounted seatbelt assembly 16 is illustrated in the attached figures. It should be understood however, that the basic components and operation of seatbelt assembly 16 will be substantially common to all mounting situations. FIG. 1 shows a portion of a pillar "P" within which seatbelt assembly 16 is mounted. Buckle assembly 18 extends outwardly from the junction between back region 12a and seat region 12b of seat 12.

Figure 2:
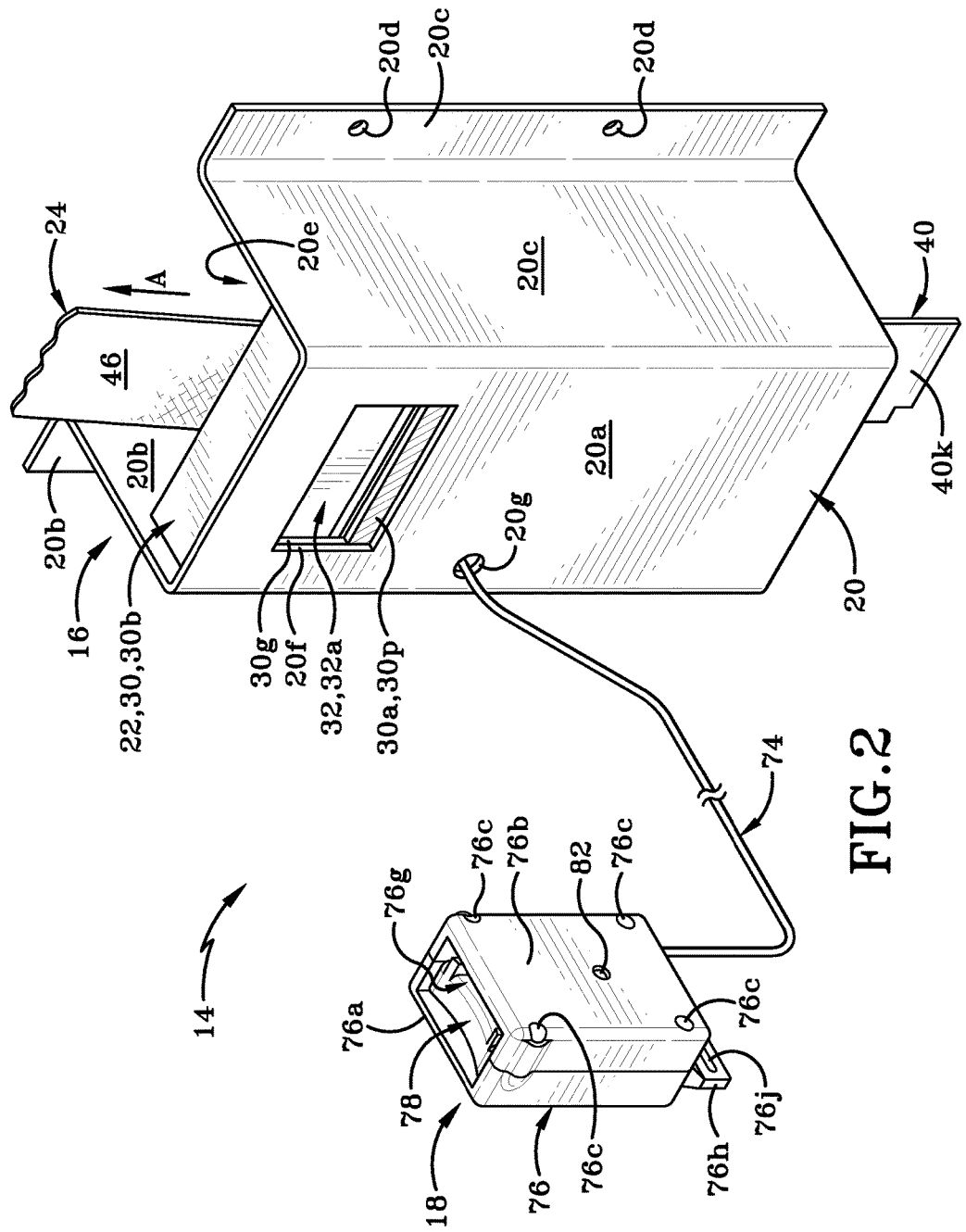
FIG. 2 is a front isometric perspective view of the seatbelt system in accordance with an aspect of the invention.
Figure 3:
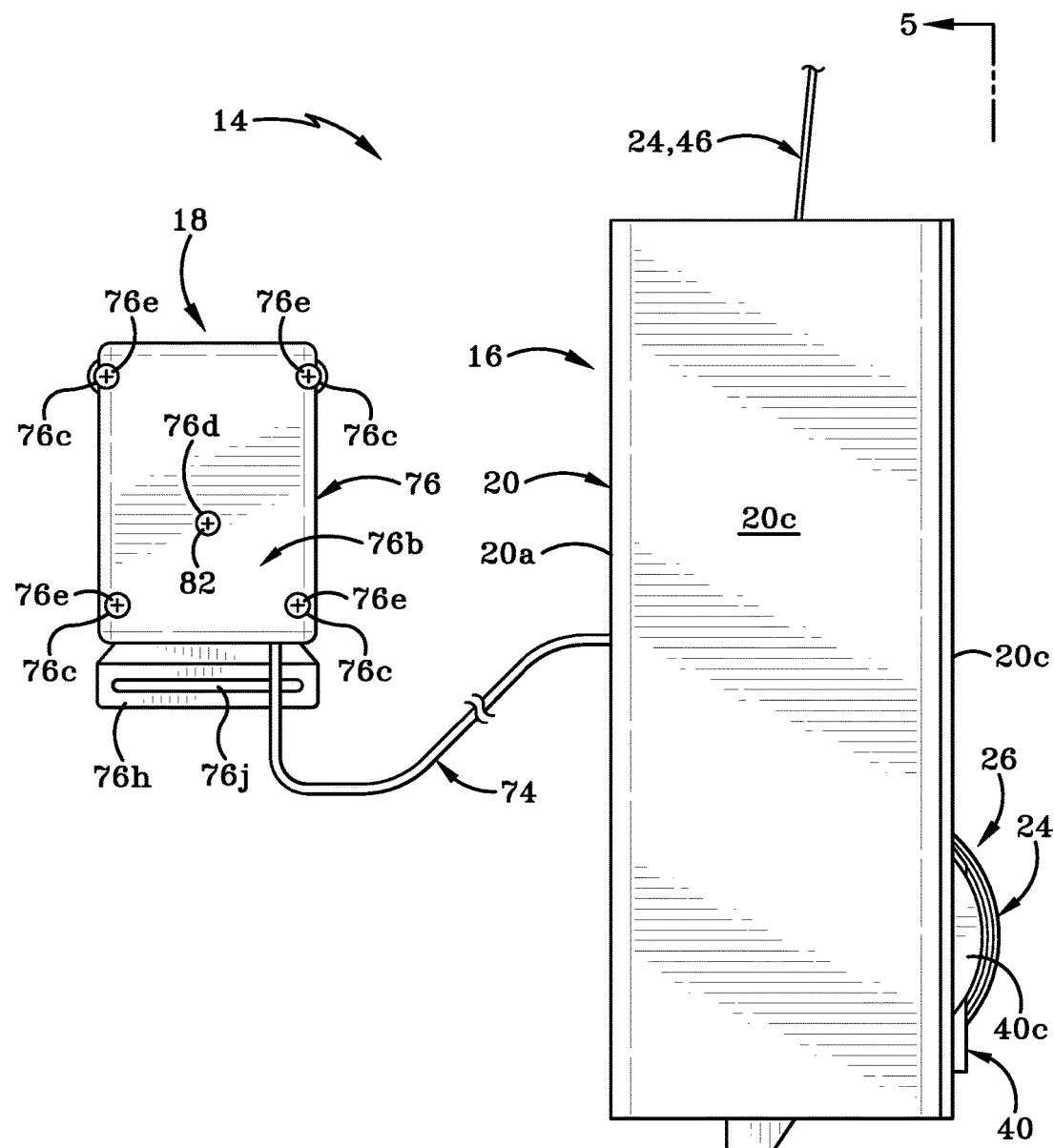
FIG. 3 is a right side elevational view of the seatbelt system of FIG. 2.

Referring now to FIGS. 2-11 and 14, housing 20 of seatbelt assembly 16 is shown in greater detail. Housing 20 may be a separate component that is mounted within an interior bore of pillar "P" (as shown in FIG. 1) or housing 20 may itself form part of pillar "P" and extend for an additional length upwardly to join a roof of the vehicle and an additional length downwardly to join a floor of the vehicle. Housing 20 may be substantially U-shaped in cross-section and include a front wall 20a, a left side wall 20b (FIG. 4) and a right side wall 20c (FIG. 2). Each of the left side wall 20b and right side wall 20c is an L-shaped component that includes a first section and a second section that are oriented at right angles to each other. The first section is oriented at right angles to front wall 20a and the second section is oriented substantially parallel to front wall 20a. A plurality of screw holes 20d are defined in the second sections of each of the left and right side walls 20b, 20c. Fasteners are provided to extend through these holes 20d to secure housing 20 to the vehicle's frame and/or to pillar "P".

A channel 20e is bounded and defined by front wall 20a, left side wall 20b and right side wall 20c of housing 20. It is into this channel 20e that various components of seatbelt assembly 16 are received, as will be further described herein. An aperture 20f is defined in front wall 20a and aperture 20f extends from an exterior surface of front wall 20a through to an interior surface thereof. Aperture 20f is in communication with channel 20e. Aperture 20f, as illustrated in the attached figures, may be generally rectangular in shape. Aperture 20f is located in a region of pillar "P" that will be easily accessible to an adult who is securing child seat 12 into the vehicle. Aperture 20f preferably is not located in a position on pillar "P" that is easily reached by a child seated on vehicle seat 10 on in child seat 12.

Front wall 20a further defines a hole 20g therein. Hole 20g extends from the exterior surface of front wall 20a through to the interior surface thereof and is in communication with channel 20e. The purposes of aperture 20f and hole 20g will be later described herein. It will be understood that any shape of aperture 20f and hole 20g may be utilized in housing 20 and one or both of aperture 20f and hole 20g may be defined in other faces of housing 20 if those locations provide better accessibility to the person who may be installing a child seat 12 or for better connection of seatbelt assembly 16 to buckle assembly 18.

Housing 20 further defines a pair of spaced apart and nested guide tracks 20h (FIG. 8) on an interior surface of each of the first and second side walls 20b, 20c. Each guide track 20h is L-shaped with one of the tracks being larger than the other. A guide path 20i is defined between the tracks 20h. Guide tracks 20h and guide path 20i on interior surface of first side wall 20b are laterally aligned with guide tracks 20h and guide path 20i on interior surface of second side wall 20c. Housing 20 also defines a ledge 20j (FIG. 4) that is connected to right side wall 20c and front wall 20a and is generally horizontally oriented relative to the vertically extending front and side walls 20a, 20b, 20c. Ledge 20j terminates a distance away from left side wall 20b. Housing 20 further includes a rear wall 20k (FIG. 4) that is spaced a distance away from front wall 20a. Rear wall 20k is of a much smaller size that front wall 20a and extends between left side wall 20b and right side wall 20c. The purpose of ledge 20j and rear wall 20k will be described later herein.

Figure 4:
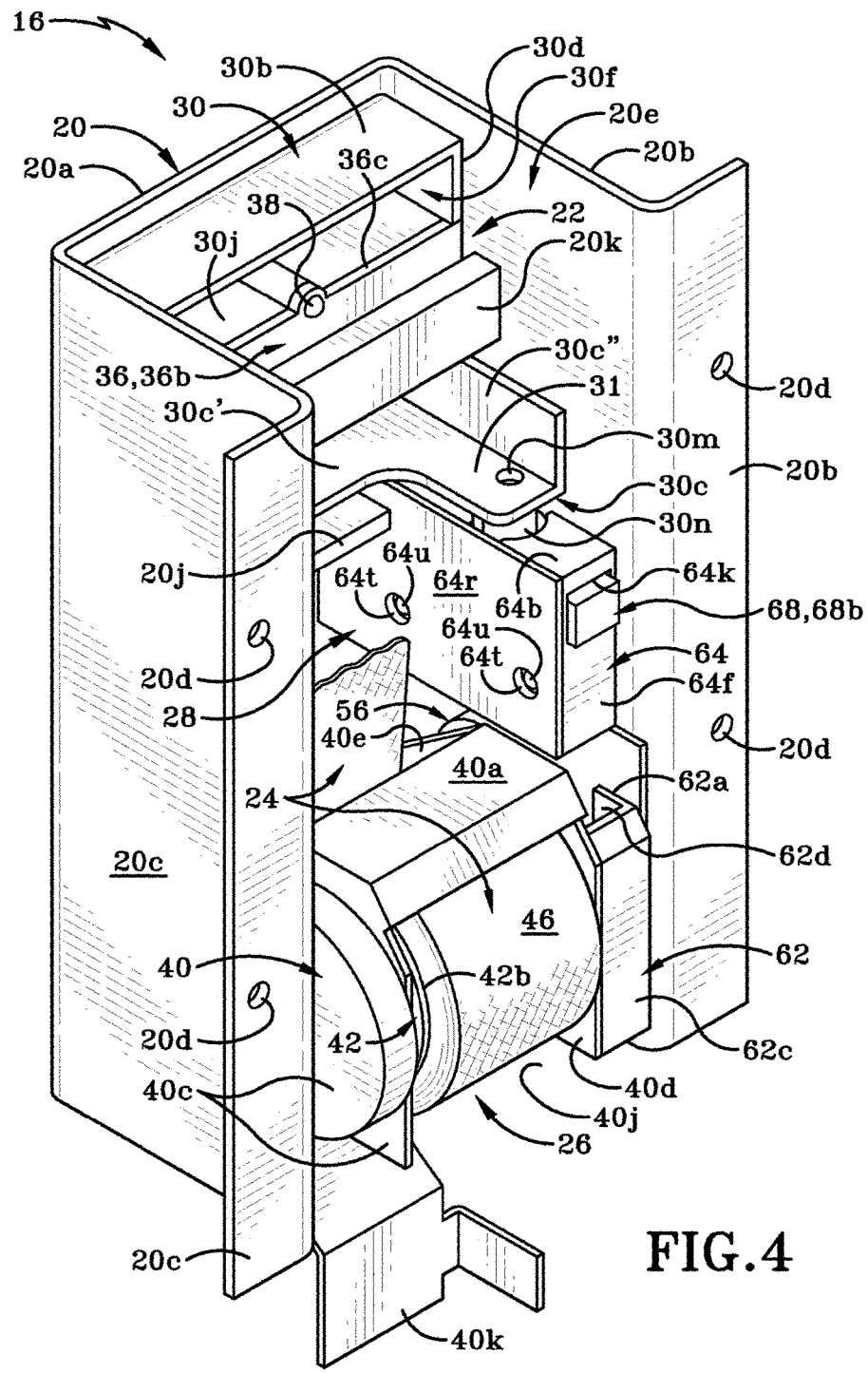
FIG. 4 is a rear perspective view of the seatbelt assembly of the seatbelt system with the seatbelt partially removed for clarity of illustration.

Referring to FIG. 4, seatbelt assembly 16 further includes an actuator assembly 22, a seatbelt 24, a retractor mechanism 26 and a cable locking assembly 28. Actuator assembly 22, retractor mechanism 26 and cable locking assembly 28 are located within channel 20e of housing 20. Rear wall 20k of housing 20 retains actuator assembly 22 in abutting contact with the interior surface of front wall 20a as is shown in FIG. 4.

Figure 9:
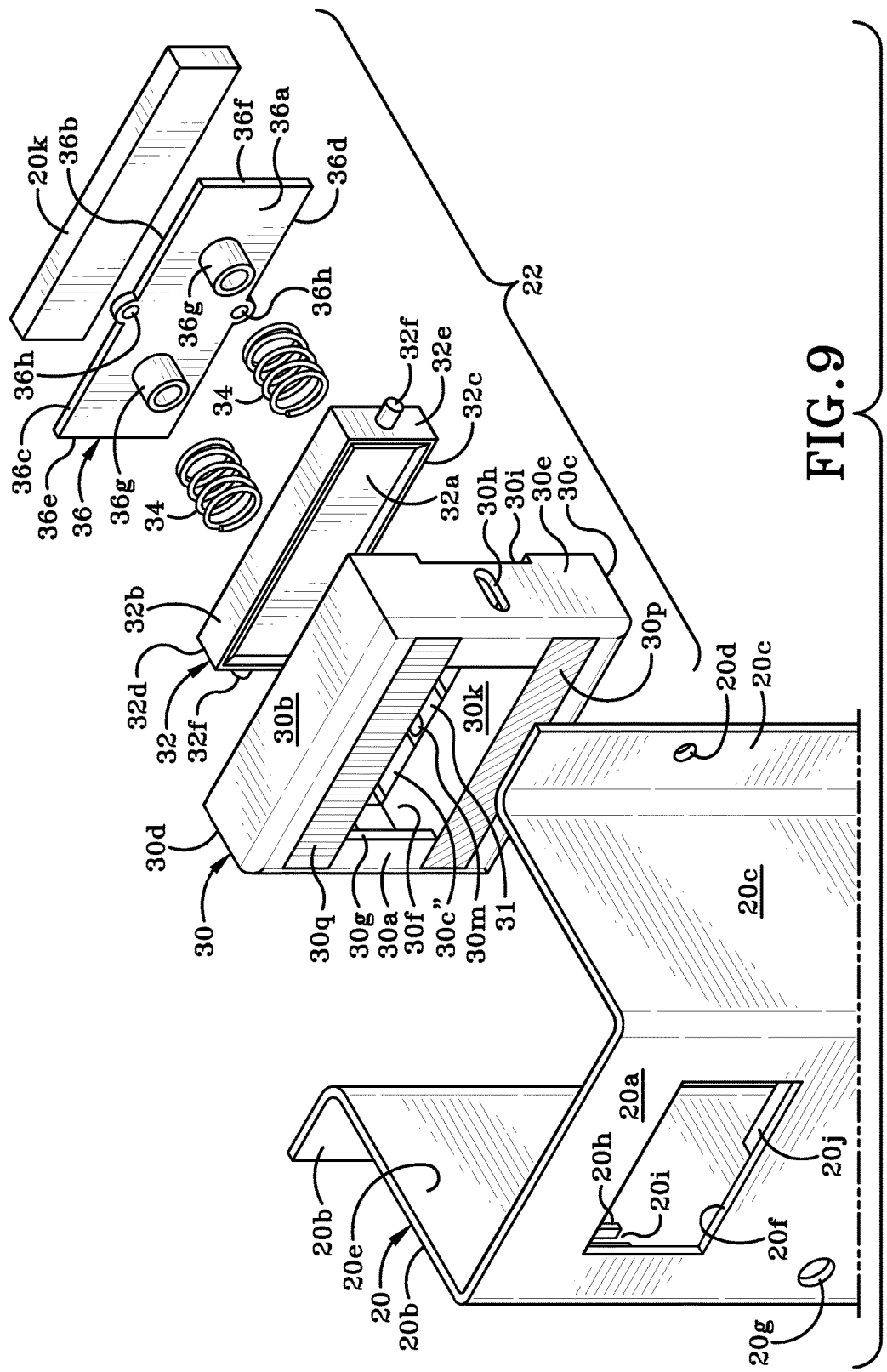
FIG. 9 is an exploded partial front isometric perspective view of the seatbelt assembly.

Referring to FIG. 9, actuator assembly 22 includes a actuator housing 30 having a front wall 30a, a top wall 30b, a bottom wall 30c, a first side wall 30d and a second side wall 30e. Front wall, top, bottom, first side and second side wall 30a-30e bound and define a cavity 30f (FIG. 4). An aperture 30g is defined in front wall 30a. Aperture 30g is positioned so as to be at least partially alignable with aperture 20f in front wall 20a of housing 20. A pair of horizontally aligned slots 30h is defined in first and second side walls 30d, 30e. A pair of aligned notches 30i may also be defined in an rear edge of first and second side walls 30d, 30e opposite front wall 30a. Actuator housing 30 also includes a pair of parallel spaced apart shelves 30j (FIG. 4) and 30k (FIG. 9). As shown in FIG. 4, bottom wall 30c may be "L-shaped" and comprises a horizontal first leg 30c' and a vertical second leg 30c". First leg 30c' may extend between left side wall 20b and right side wall 20c of housing 20 when actuator assembly 22 is engaged with housing 20. Second leg 30c" may extend vertically and be in abutting contact with left side wall 20b of housing 20 when actuator assembly 22 is engaged with housing 20. First leg 30c' may also be generally L-shaped having an arm 31 that extends for a distance rearwardly beyond the rearmost edges of top wall 30b and first and second side walls 30d and 30e. Arm 31 defines a projection 30n (FIG. 14) that extends downwardly for a distance beyond a lower surface of bottom wall 30c. A hole 30m (FIGS. 4 and 14) is defined in arm 31 of bottom wall 30c and extends from an upper surface of arm 31 to a bottom end of projection 30n. Hole 30m thus forms a channel through projection 30n, the purpose of which will be discussed later herein.

FIG. 9 shows that actuator housing 30 may also be provided with a first indicator 30p and a second indicator 30q on front wall 30a. First indicator 30p may comprise a first color stripe that is provided in a region below aperture 30g. Second indicator 30q may comprise a second color stripe that is provided in a region above aperture 30g. For example, first indicator 30p may be green in color and second indicator 30q may be red in color. First and second indicators 30p and 30q are provided so that a user may readily determine visually if seatbelt assembly is in a condition ready to dispense seatbelt 24 therefrom or if seatbelt 24 is cinched and locked.

Figure 14:
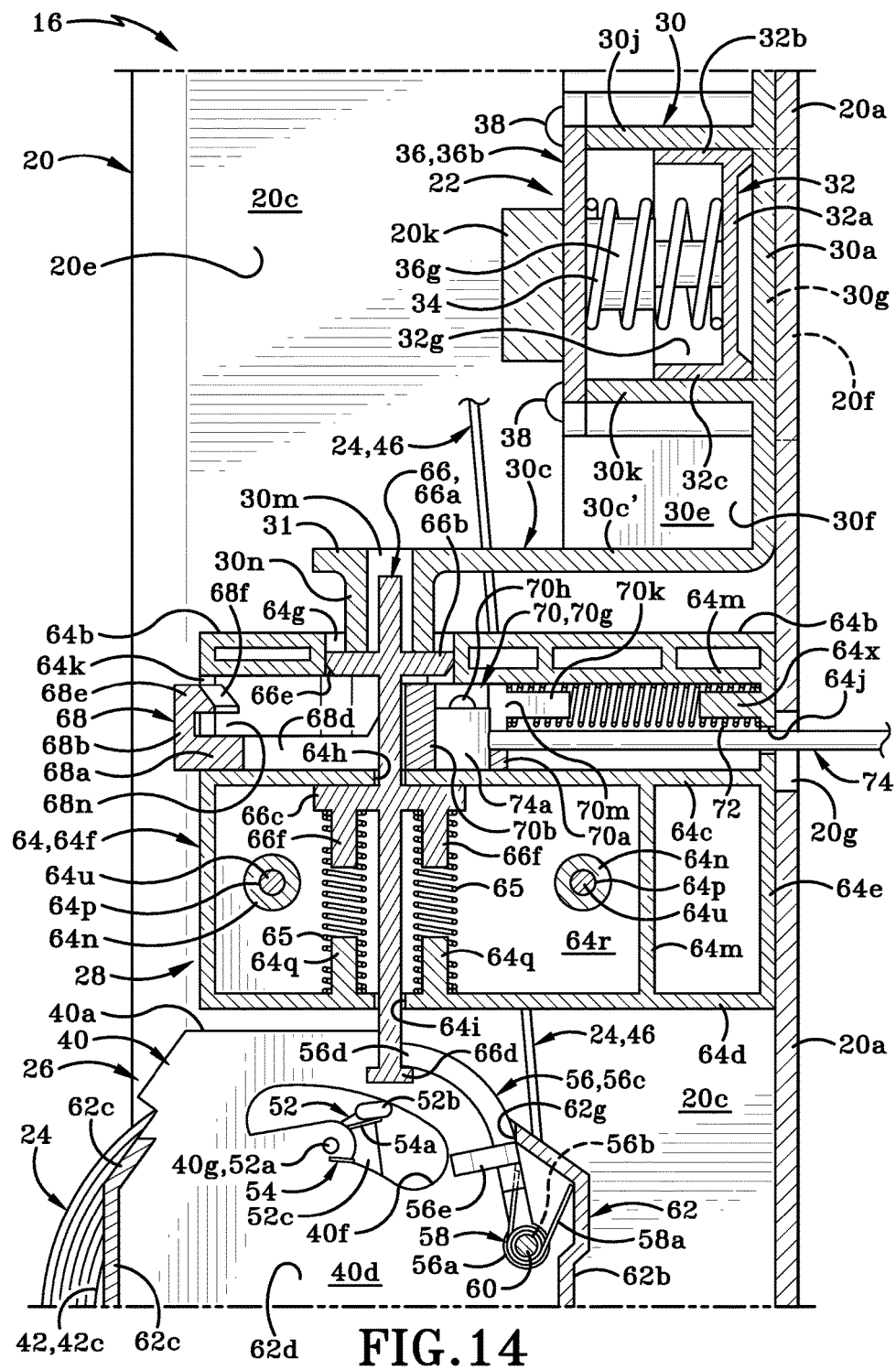
FIG. 14 is a cross-section of the seatbelt assembly taken along line 14-14 of FIG. 6.

A button 32 (FIG. 9) is provided for engagement in actuator housing 30. Button 32 has a front wall 32a, a top wall 32b, a bottom wall 32c, a first side wall 32d and a second side wall 32e. Posts 32f extend outwardly from first and second side walls 32d, 32e and generally at right angles relative thereto. Each post 32f is shaped and sized to be received through one of slots 30h in actuator housing 30 and ultimately into guide path 20i defined between the L-shaped guide tracks 20h as will be described hereafter. Front wall 32a, top wall 32b, bottom wall 32c, first side wall 32d and second side wall 32e bound and define a chamber 32g (FIG. 14).

As button 32 is depressed and released (as will be described later herein) posts 32f travel along guide path 20i. (Guide path 20i is the L-shaped path defined by the spaced-apart guide tracks 20h on housing 20. A first leg of guide path 20ih is substantially horizontally oriented and a second leg of guide path 20i is substantially vertically oriented.) When posts 32f travel along the horizontally oriented leg of guide path 20i, button 32 moves away from or toward the interior surface of front wall 30a of actuator housing 30. The travel of button 32 is in a plane substantially parallel to front wall 30a and therefore to front wall 20a of housing 20. The horizontal movement of button 32 is limited by the length of slot 30h in housing sides 30d, 30e. When the posts 32f travel along the vertically oriented leg of guide path 20i because posts 32f are captured within actuator housing 30, the actuator housing 30 itself being caused to move up and down relative to the interior surface of housing 20. The extent of vertical travel in an upward direction is limited by the larger of the two guide tracks 20h. The extent of vertical travel in a downward direction is limited by shelf 20j. Other means may be provided to limit travel of posts 32f and therefore actuator housing 30. A shelf 20m (FIG. 5) is secured to front wall 20a and side wall 20b and is positioned to support a cover 62 thereon (as will be described later herein.)

Actuator assembly 22 further includes a rear plate 36 (FIG. 9). Rear plate 36 has a front surface 36a, rear surface 36b, top surface 36c, bottom surface 36d, first side surface 36e, and second side surface 30f. Rear plate 36 is sized so as to be received in notches 30i of actuator housing 30. A pair of posts 36g extends outwardly from front surface 36a of rear plate 36. A coil spring 34 is received around each post 36g. Coil springs 34 engage a rear surface of front wall 32a of button 32 and urge button 32 into a closed position. In the closed position the front wall 32a of button 32 is positioned adjacent an interior surface of front wall 30a of actuator housing 30. Rearward travel of button 32 is limited by the presence of rear plate 36, the posts 36g thereon and coil springs 34. A pair of apertures 36h is defined in rear plate 36. Fasteners 38 (FIG. 4) are inserted through these apertures 36h to secure rear plate 36 to shelves 30j, 30k of actuator housing 30.

Figure 10:
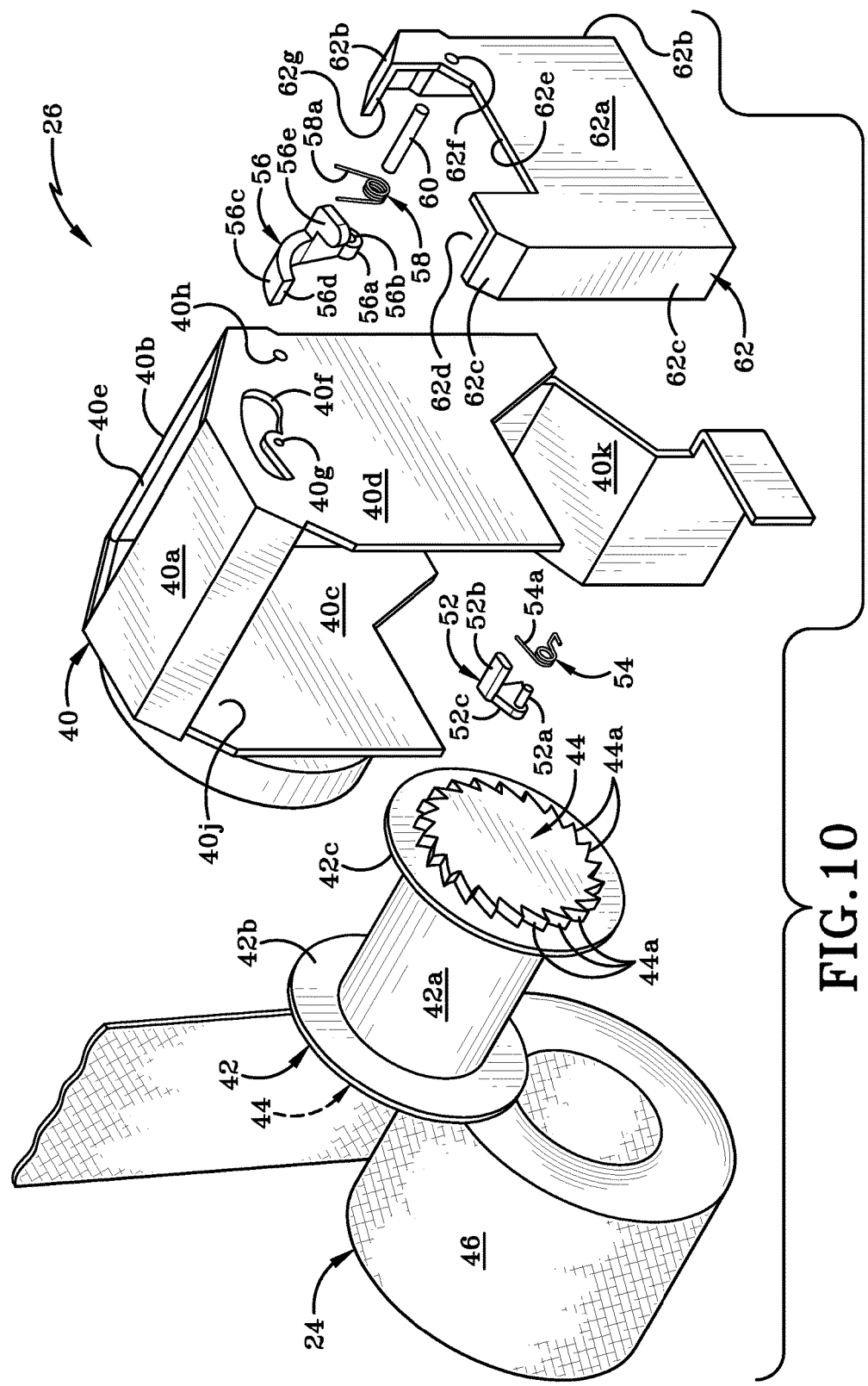
FIG. 10 is an exploded partial rear isometric perspective view of the seatbelt assembly.

Seatbelt 24 and retractor mechanism 26 may be of any type known in the art and the seatbelt 24 and retractor mechanism 26 illustrated in the figures are provided by way of example only and should not be considered to limit the invention. Referring to FIG. 10, retractor mechanism 26 includes a housing 40 that has a top wall 40a, a rear wall 40b, a first side wall 40c and a second side wall 40d. An aperture 40e is defined in top wall 40a that may be of a relatively large size and may be generally rectangular in shape. A slot 40f, a first hole 40g and a second hole 40h are defined in second side wall 40d. Top wall 40a, rear wall 40b, first and second side walls 40c, 40d, bound an define a cavity 40j that is accessible through an opening defined opposite rear wall 40b. Housing 40 also includes a downwardly extending flange member 40k.

Retractor mechanism 26 further comprises a spool 42 (FIG. 10) that is supported for rotation within cavity 40j of housing 40. (An axle that supports spool 42 for rotation within housing 40 and a torsion spring for controlling that rotation are not shown in the attached figures for clarity of illustration.) Spool 42 comprises a hub 42a, a first end 42b and a second end 42c. A ratchet wheel 44 having a plurality of teeth 44a on a circumferential surface thereof is provided on an exterior surface of one or both of the first and second ends 42b, 42c as may be seen in FIGS. 5-7.

Seatbelt 24 comprises a length of webbing 46 and a locking tongue 48 (FIG. 1) that is engaged on webbing 46 and is slidingly movable therealong. Locking tongue 48 is configured to be selectively engageable in buckle assembly 18 as illustrated in FIG. 1. Webbing 46 is secured at one end to spool 42 and is able to be wound onto spool 42 when spool 42 is rotated in a first direction; and is windable off of spool 42 when spool 42 is rotated in a second direction. Webbing 46 is threaded through aperture 40e defined in housing 40 and then through a U-shaped flange 50 (FIG. 1) mounted on pillar "P" of the vehicle. Although not shown in the attached figures, it should be understood that a second end of webbing 46 is fixedly secured to a region of the vehicle's frame or to pillar "P" a distance away from flange 50.

Retractor mechanism 26 further includes a pawl mechanism 52 (FIG. 10) that comprises a pin 52a, a foot 52b, and a pawl 52c. A spring 54 is engaged with pin 52a. Pawl mechanism 52 is positioned within cavity 40j of housing 40 between second end 42c and an interior surface of second side wall 40d of housing 40. Pin 52a is received through hole 40g in second side wall 40d and an arm 54a of spring 54 engages the underside of foot 52b as may be seen in FIG. 15. Arm 54a urges pawl 52c out of engagement with teeth 44a on second end 42c.

As shown in FIG. 10, retractor mechanism 26 further includes a lever arm 56, a spring 58 and a pin 60. Lever arm 56 has a first end 56a that defines a hole 56a therein and through which one end of pin 60 is received. Lever arm 56 further includes a hook 56c that curves outwardly away from first end 56a and terminates in a free end 56d remote from first end 56a. Lever arm 56 further includes a flange 56e that extends outwardly from a side surface of hook 56c approximately one third along the length of hook 56c between first end 56a and free end 56d.

A cover 62 is provided to engage second side wall 40d of housing 40 and protect lever arm 56. Cover 62 includes an end wall 62a, a front wall 62b and a rear wall 62c. End wall 62a, front wall 62b and rear wall 62c bound and define a recess 62d that is accessible through an opening 62e in an uppermost end of cover 62. A hole 62f is defined in end wall 62a. When cover 62 is engaged with second side wall 40d of housing 40, hole 62f is aligned with hole 40h. A first end of pin 60 is received through hole 40h and a second end of pin 60 is received through hole 62f. Pin 60 is also inserted through a central aperture defined by a coil of spring 58 and through hole 56b in lever arm 56. When all of these components are engaged with each other, lever arm 56 is able to pivot about pin 60. An arm 58a of spring 58 contacts an interior surface of rear wall 62c of cover 62 and urges free end 56d of lever arm 56 towards foot 52b of pawl mechanism 52. This may be seen in FIG. 14. A surface 62g (FIG. 14) is provided on cover 62 that acts as a limiting member for hook 56.

Pawl 52c is configured to selectively interlock with teeth 44a and thereby selectively prevent rotation of ratchet wheel 44 and consequently of spool 42. As indicated earlier herein, a torsion spring (not shown) forms part of spool 42. The torsion spring is positioned so that when spool 42 is rotated in a counter-clockwise direction, the torsion spring will tend to unwind. When a force causing the counter-clockwise rotation of spool 42 is stopped, the torsion spring will tend to return to its original size, shape and position and will coil up once again; thereby causing spool 42 to rotate in the clockwise direction. When someone is buckled into seat 10, a length of webbing 46 is pulled out of housing 40 in the direction of arrow "A" shown in FIG. 2 until locking tongue 28 is able to be engaged in buckle assembly 18. If that person bends forward in seat 10, spool 42 will rotate in a counter-clockwise direction and an additional length of webbing 46 will be unwound from spool 42. As spool 42 rotates, it unwinds the torsion spring engaged therewith. When the person sits back in seat 10, i.e., moves in the opposite direction, webbing 46 will initially become slightly slack, and because the force pulling webbing 46 out of housing 40 is stopped, the torsion spring will return to its original shape and position and, as it does so, the torsion spring will rotate spool 42 clockwise. The clockwise rotation of spool 42 will wind webbing 46 back onto spool 42 drawing up the slack in webbing 46 and causing webbing 45 to be drawn back into housing 40 in the direction opposite to arrow "A".

Figure 15:
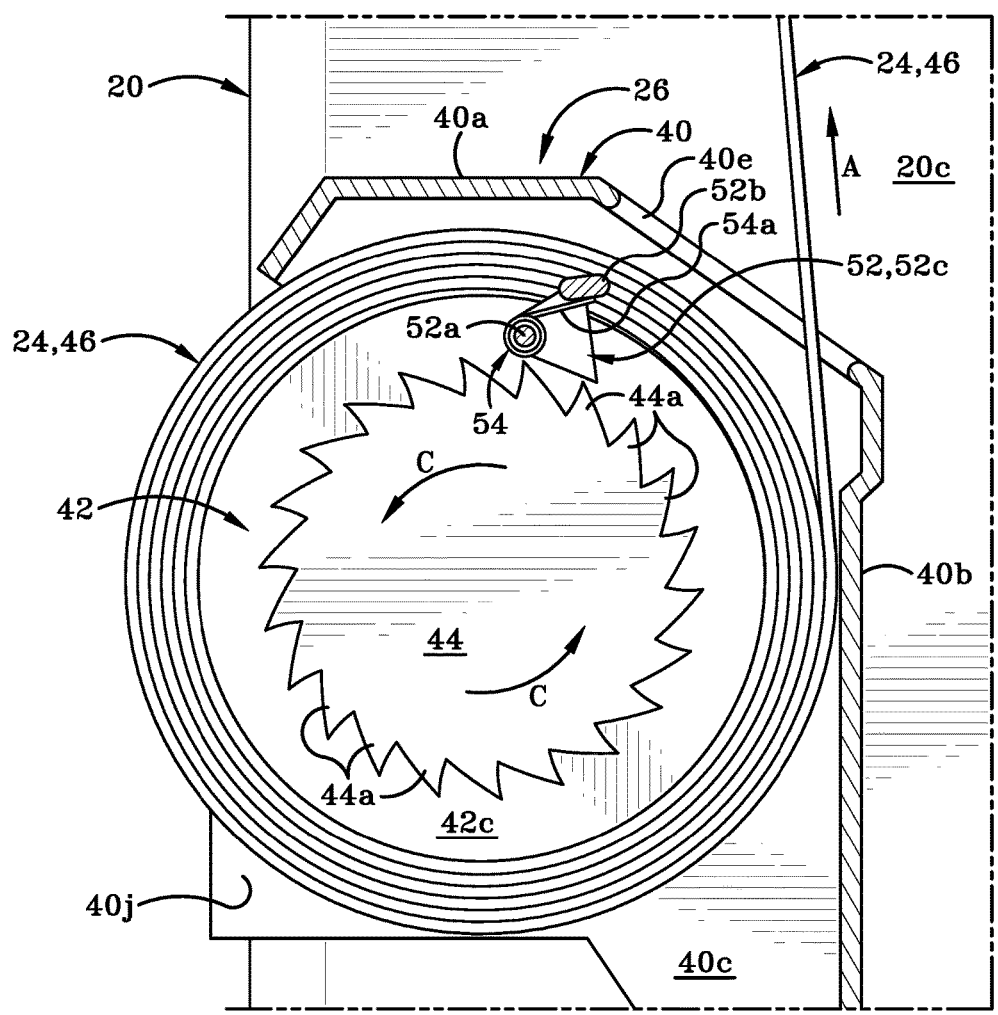
FIG. 15 is a cross-section of the seatbelt assembly taken along line 15-15 of FIG. 6.
Figure 22:
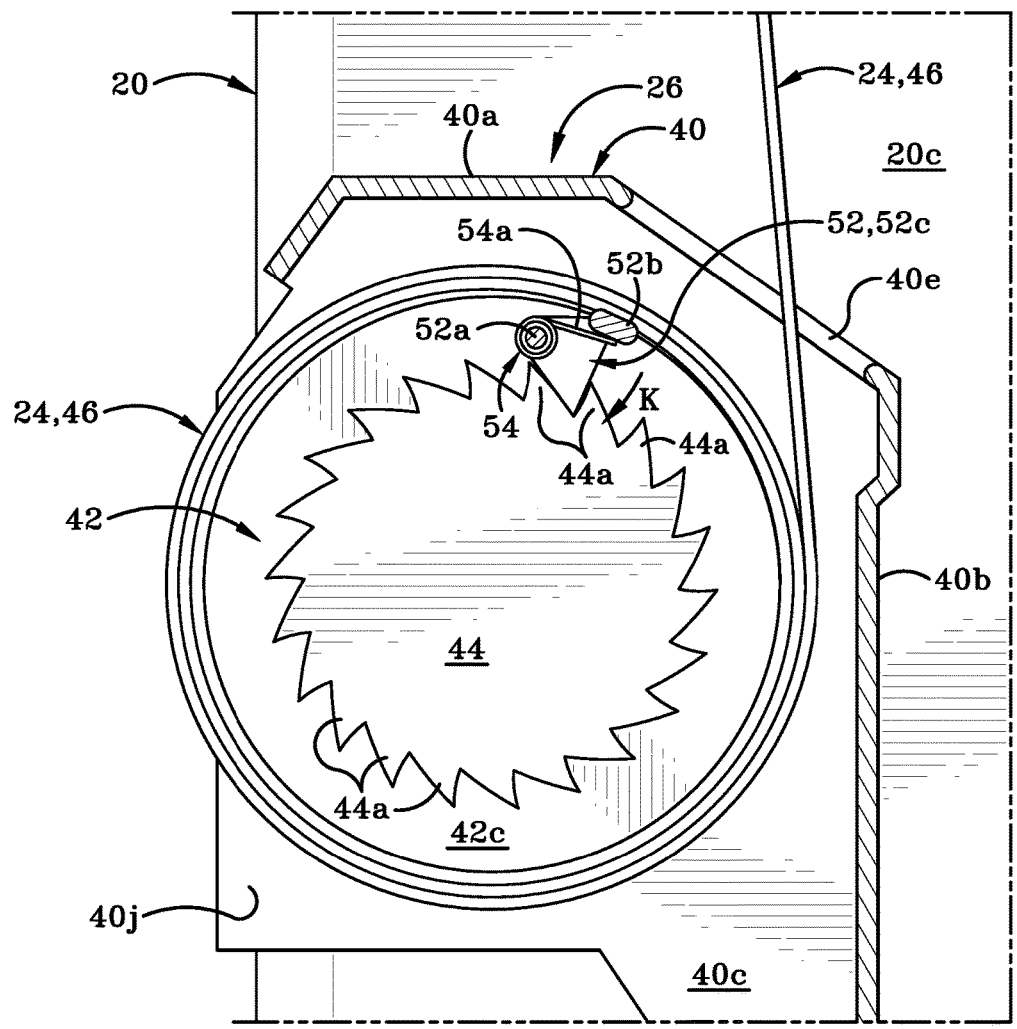
FIG. 22 is a partial longitudinal cross-section through the retractor mechanism housing showing the pawl engaged with the teeth of the ratchet wheel.

Ratchet wheel 44 is operatively engaged with spool 42 so that ratchet wheel 44 and spool 42 rotate in unison and in the same direction. If rotation of spool 42 is to be halted, then ratchet pawl 52c will be rotated from a disengaged position shown in FIG. 15 to an engaged position shown in FIG. 22. In FIG. 15, the pawl 52c is not interlockingly engaged with teeth 44a on ratchet wheel 44. In FIG. 22, pawl 52c is interlocking engaged with teeth 44a on ratchet wheel 44. In order to move pawl 52c from the disengaged position to the engaged position, foot 52b must overcome the spring force of arm 54a of spring 54 and move downwardly towards ratchet wheel 44. Seatbelt assembly 16 is provided with a mechanism to cause foot 52b to overcome the spring force of arm 54a and this mechanism will be further described below.

It should be noted that seatbelt assembly 16 may be of a type that includes an emergency locking retractor (ELR) in addition to pawl mechanism 52. ELRs are well known in the art and any suitable mechanism for producing emergency locking of the seatbelt may be utilized in the present invention. ELR ensures that if the vehicle has to come to a sudden stop, during a collision for example, the spool 42 and therefore the webbing 46 will be substantially immediately locked against rotational movement. This ensures that any forward inertial movement of someone buckled into the vehicle by seatbelt assembly 16 will be substantially immediately arrested. The ELR includes any suitable locking mechanism, such as a pendulum type weight, that will engage teeth 44a of ratchet wheel 44 and stop all rotation of the same. When the vehicle comes to a sudden stop, the locking mechanism will cause ratchet wheel 44 to be locked into position and since ratchet wheel 44 is operatively engaged with spool 42, any further rotation of spool 42 is substantially prevented.

Figure 5:
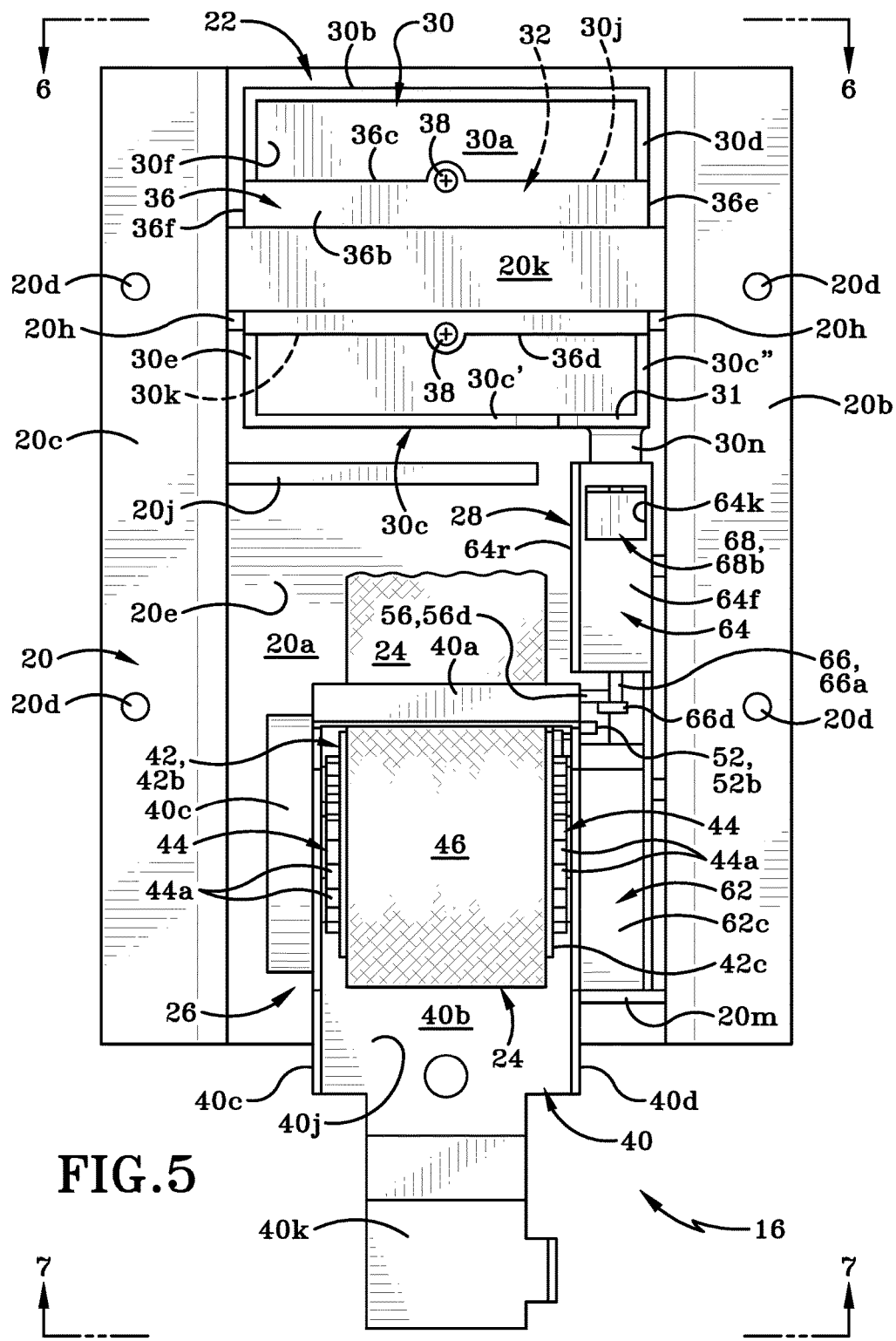
FIG. 5 is a rear elevation view of the seatbelt assembly of the seatbelt system taken along line 5-5 of FIG. 3.
Figure 6:
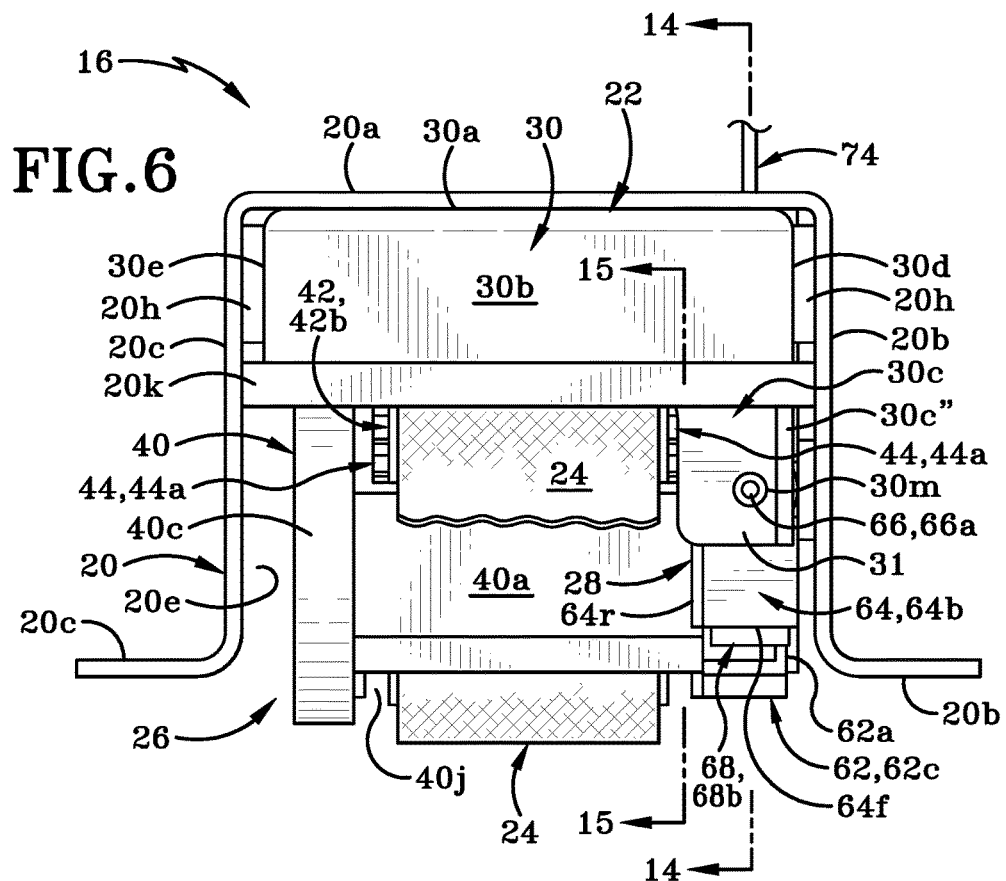
FIG. 6 is a top plan view of the seatbelt assembly taken along line 6-6 of FIG. 5
Figure 7:
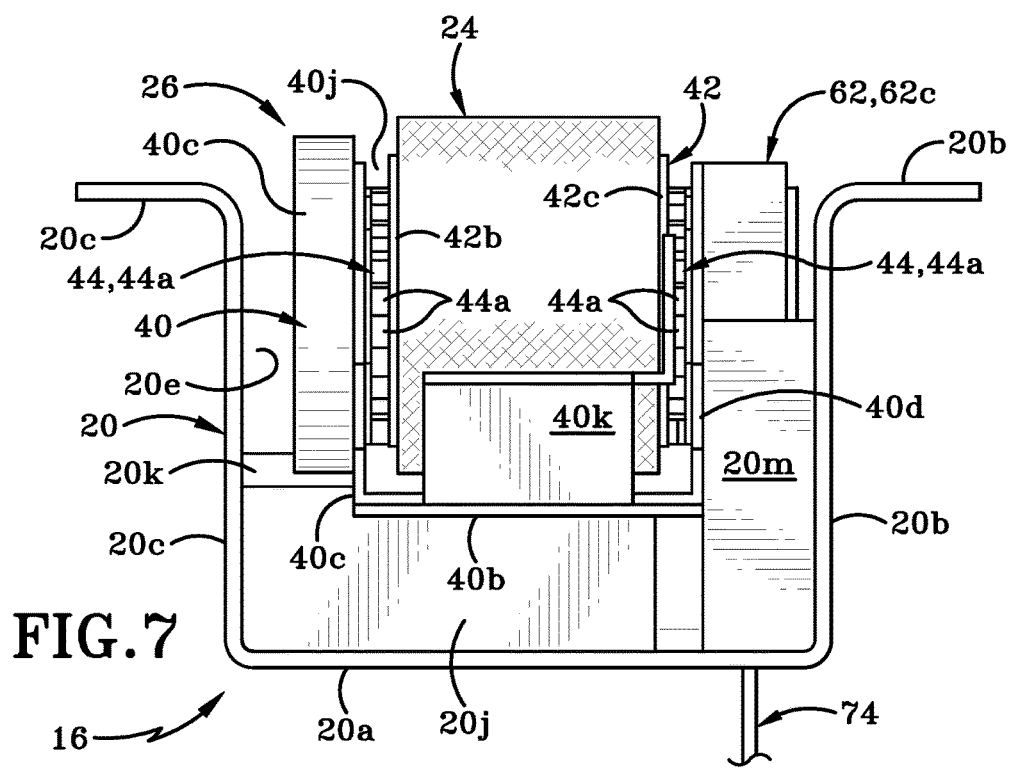
FIG. 7 is a bottom plan view of the seatbelt assembly taken along line 7-7 of FIG. 5.
Figure 8:
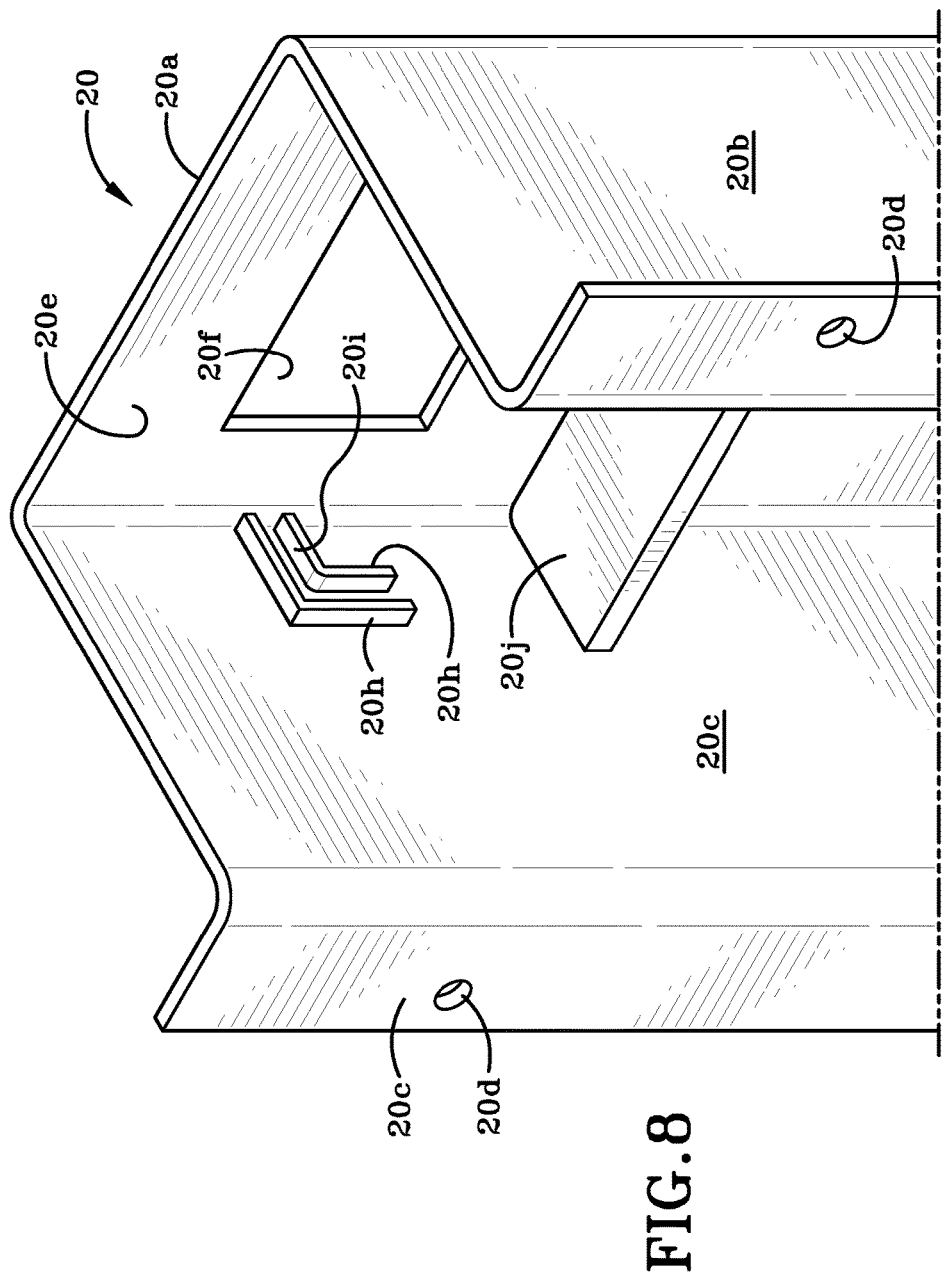
FIG. 8 is a rear isometric perspective view of the housing of seatbelt assembly showing a pair of guide tracks provided thereon.
Figure 11:
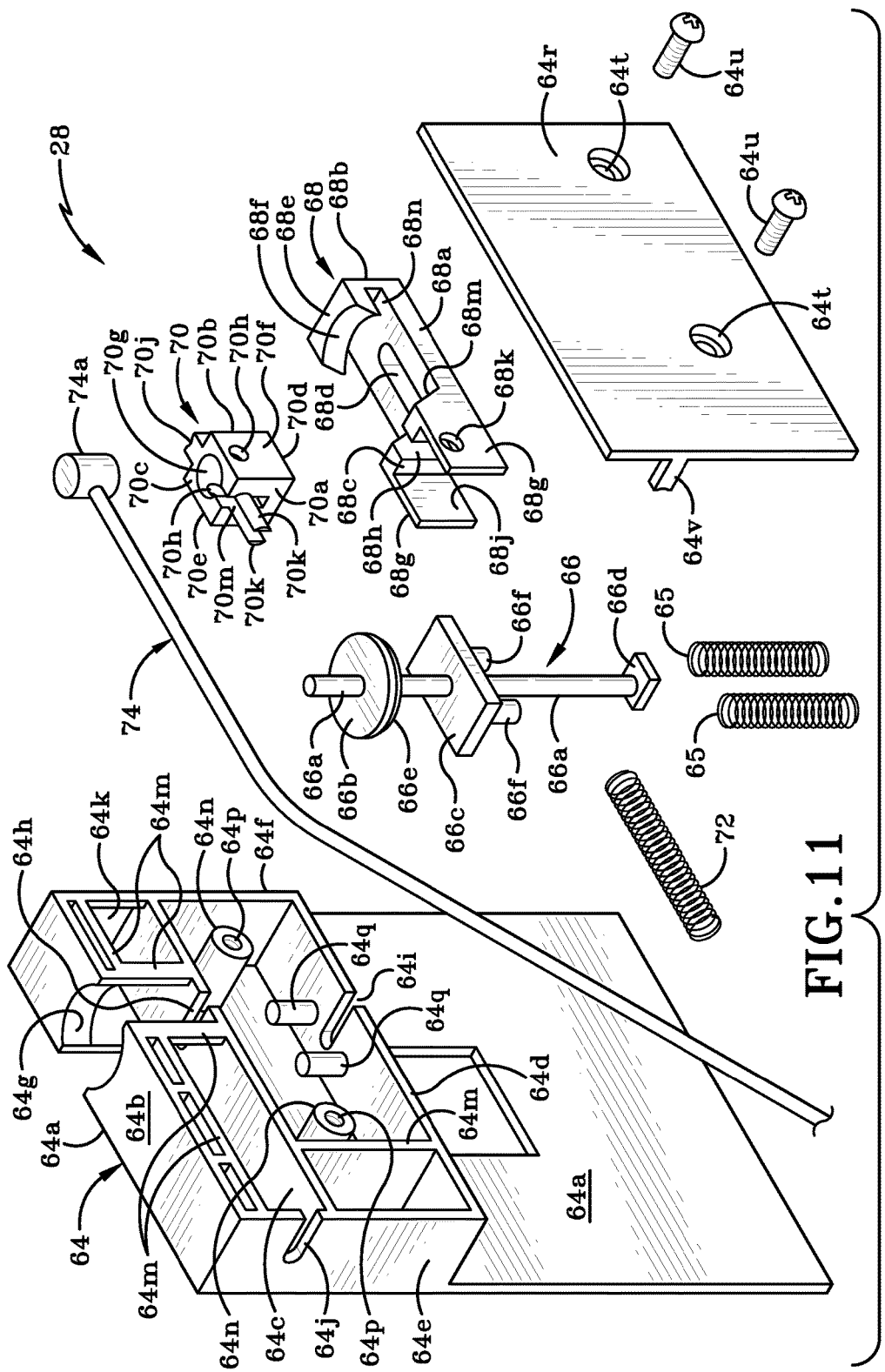
FIG. 11 is an exploded isometric perspective view of the actuator assembly of the seatbelt assembly.

As shown in FIG. 5, cable locking assembly 28 is provided within actuator housing 30. FIG. 11 shows cable locking assembly 28 in greater detail. Cable locking assembly 28 includes a housing 64 having a first side wall 64a from which extend three horizontal walls, namely an upper wall 64b, a middle wall 64c, and a lower wall 64d; and two vertical walls, namely front wall 64e and rear wall 64f. Upper wall 64b defines an aperture 64g therein that is shaped and sized to receive projection 30n from actuator housing 30 therein. Middle wall 64c defines a slot 64h therein that is vertically aligned with aperture 64g. Lower wall 64d defines a slot 64i there in that is vertically aligned with slot 64h and with aperture 64g. Front wall 64e defines a horizontal slot 64j therein. Slot 64j is located between upper wall 64b and middle wall 64c. Rear wall 64f defines an opening 64k (FIG. 4) therein that extends between a lower surface of upper wall 64b and an upper surface of middle wall 64c. A plurality of supports 64m are provided in various locations between upper, middle and lower walls 64b, 64c, 64d. A pair of horizontally oriented posts 64n extends outwardly from an interior surface of first side wall 64a. Each post 64n defines an internally threaded bore 64p therein. A pair of vertical posts 64q extends upwardly from an upper surface of lower wall 62c and on opposite sides of slot 64i. A coil spring 65 is engageable around each post 64q. Housing 64 further includes a second side wall 64r that is selectively engaged with upper, middle and lower walls 64b, 64c, 64d. Second side wall 64r has an exterior surface and an interior surface. Countersunk holes 64t are defined in second side wall 64r and each hole 64t extends between the interior and exterior surfaces of wall 64r. A fastener 64u is received through each hole 64t and is subsequently received into threaded bore 64p of one of posts 64n. One or more posts 64v extend outwardly from the interior surface of second side wall 64r and slides into a portion of slot 64j of front wall 64f of housing 64. As best seen in FIG. 14, a horizontally extending post 64x projects inwardly from an interior surface of front wall 64e in a location between top wall 64b and middle wall 64c and above slot 64j.

Cable locking assembly 28 further includes a plunger 66, a slider 68, a cable fastener 70, and a coil spring 72. Slider 68 and cable fastener 70 are configured to be received in the space defined between upper wall 64b and middle wall 64c of housing 64. Cable fastener 70 engages a first end 74a of a cable 74. Cable 74 extends from buckle assembly 18, through hole 20g in front wall 20a of housing 20, through slot 64j of housing 64 and the first end 74a of cable 74 is then engaged with cable fastener 70.

Plunger 66 includes a shaft 66a, first plate 66b; a second plate 66c and a third plate 66d. First plate 66b may be generally circular in shape when viewed from above and includes a beveled annular lower surface 66e. Second plate 66c is spaced a distance vertically below first plate 66b. Second plate 66b may be generally rectangular when viewed from above. A pair of posts 66f extends downwardly from a lower surface of second plate 66b and towards third plate 66d. Third plate 66d may be generally square or rectangular when viewed from above. Plunger 66 is engaged with cable locking assembly 28 such that a first region of shaft 66a extends upwardly through aperture 64g, a second region of shaft 66a extends through slot 64h in middle wall 64c, and a third region extends through slot 64i in lower wall 64d. When plunger 66 is engaged in housing 64, first plate 66b is located between upper and middle walls 62b and 62c; second plate 66c is located between middle wall 64c and lower wall 64d of housing 64; and third plate 66d is located a distance beneath lower wall 64d. Third plate 66d is positioned proximate foot 52b of retractor mechanism 26 as can be seen in FIG. 14. Posts 66f extending downwardly from second plate 66c are vertically aligned with posts 64q extending upwardly from lower wall 64d of housing 64. Coil springs 65 extend around posts 66f and around posts 64q. When plunger 66 moves downwardly inside housing 64 (in the direction indicated by arrow "I" in FIG. 19) coil springs 65 become compressed between second plate 66c and lower wall 64d. When coil springs 65 return to their original size and position, they cause plunger 66 to move in the opposite direction to arrow "I" and urge second wall 66c of plunger 66 away from lower wall 64d.

As shown in FIG. 11, slider 68 includes a base 68a with a vertical wall 68b at a first end and a vertical wall 68c at a second end. A longitudinal slot 68d is defined in base 68a. A hook member 68e extends outwardly from an upper end of wall 68b. Hook member 68e is located a spaced distance above base 68a and extends for a distance above base 68a. Hook member 68e includes a chamfered and convexly shaped wall 68f. A pair of arms 68g extends longitudinally outwardly from second wall 68c. Arms 68g may be generally parallel to each other. A vertical slot 68h is defined in second wall 68c and this slot 68h is aligned with and in communication with slot 68d. Arms 68g are spaced laterally from each other and a gap 68jj is defined between the interior surfaces of arms 68g. Gap 68j is in communication with slots 68d and 68h. The width of gap 68j is complementary to the width of cable fastener 70 and cable fastener 70 is configured to be received within gap 68j. An aperture 68k is defined in at least one arm 68g. Aperture 68k may be oriented at right angles to a longitudinal axis of slider 68, wherein the longitudinal axis runs along slot 68d. Slider 68 also includes an angled surface 68m that extends upwardly from an upper surface of base 68a and in a direction opposite to the chamfered surface 68f. Angled surface 68m is, however, planar instead of curved. A space is defined between surface 68m and chambered surface 68f.

Referring still to FIG. 11, cable fastener 70 may be a generally cubically-shaped component that has a front surface 70a, a rear surface 70b, a top surface 70c, a bottom surface 70d, and side surfaces 70e and 70f. A circular bore 70g is defined in cable fastener 70 and bore 70g extends from top surface 70c through to bottom surface 70d. A pair of aligned apertures 70h is defined in the opposed side walls 70e, 70f and apertures 70h are in communication with bore 70g. A projection 70j extends outwardly and rearwardly from rear surface 70b and projection 70j runs from adjacent top surface 70c through to bottom surface 70d and may be generally rectangular in shape. A pair of arms 70k extends outwardly and forwardly from front surface 70a. Arms 70k are generally parallel and aligned with each other. Arms 70k are also longitudinally aligned with second region 70j' of projection 70j. A slot 70m is defined in front surface 70a and slot 70 m originates in top surface 70c and extends for a distance downwardly towards bottom surface 70d and also extends forwardly between arms 70k. The width of cable fastener 70 is measured as the distance between side surfaces 70e and 70f. This width is complementary to the width of gap 68j in slider 68. When cable fastener 70 is received within gap 68j of slider 68, projection 70j is received within vertical slot 68h of slider 68 and in such a way that second region 70j' extends towards surface 68f. Holes 70h in cable fastener 70 are aligned with hole 68k in slider 68. A fastener (not shown) is inserted through the aligned holes 68k and 70h to secure slider 68 and cable fastener 70 together. Coil spring 72 (FIG. 11) is positioned so that a first end thereof engaged with post 64x on front wall 64e of housing 64 and a second end thereof is engaged with arms 70k of cable fastener 70.

Figure 12:
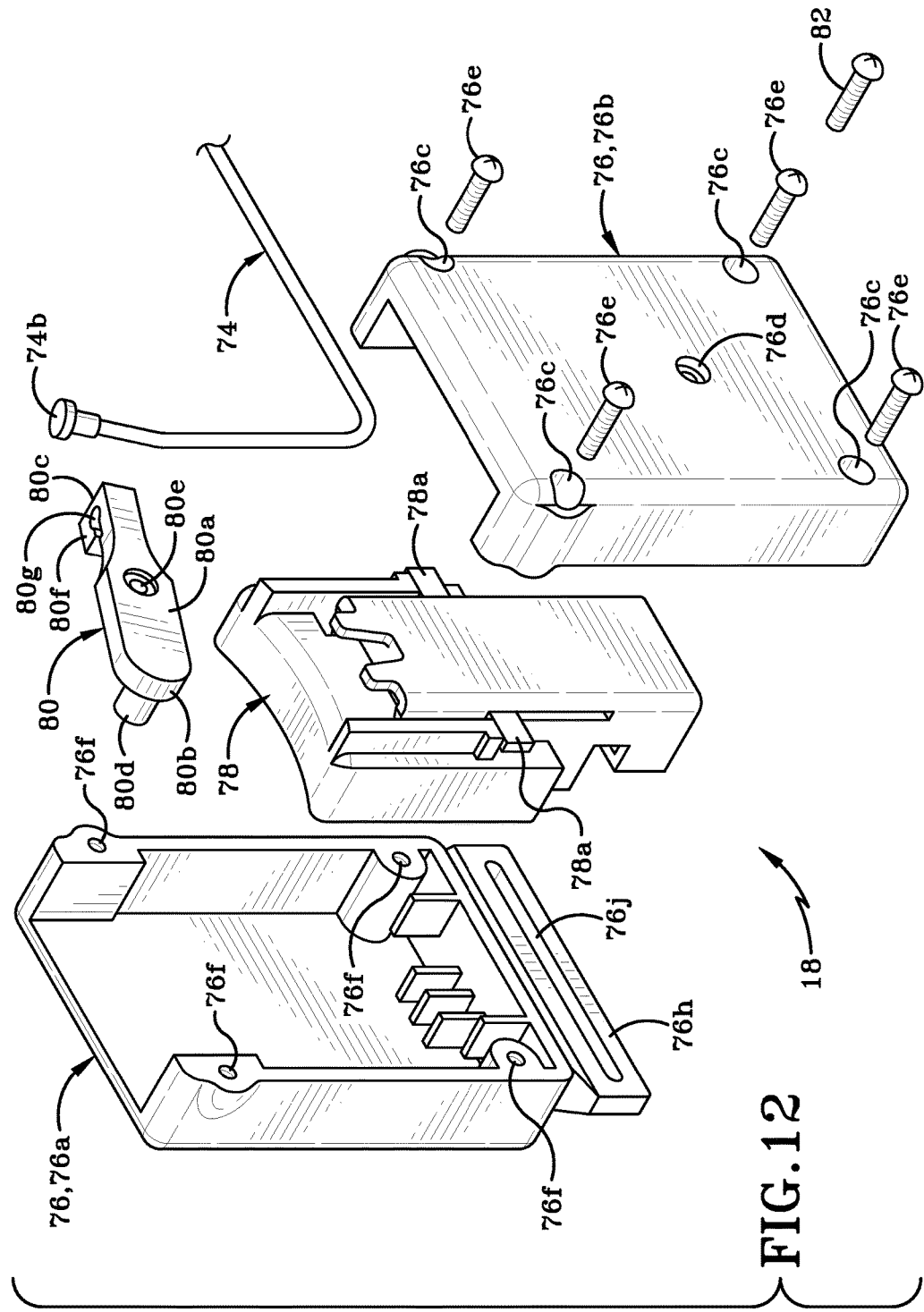
FIG. 12 is an exploded isometric perspective view of the buckle assembly.
Figure 13:
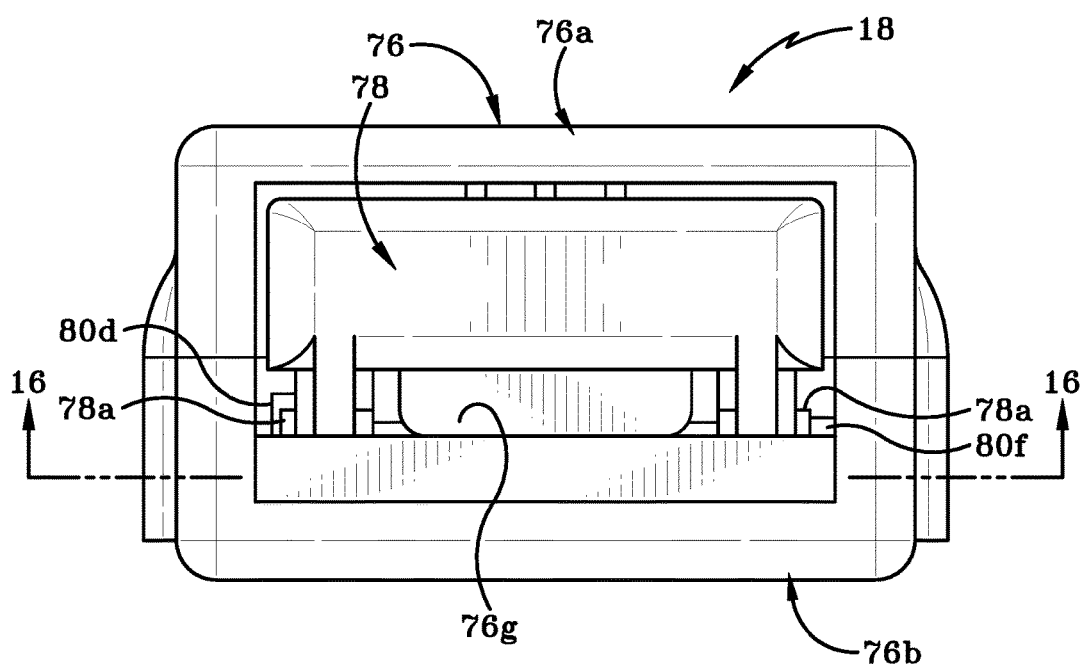
FIG. 13 is a top plan view of the buckle assembly.

Turning now to FIG. 12, buckle assembly 18 is shown in greater detail. Buckle assembly 18 comprises a housing 76 and a buckling mechanism 78 engaged with housing 76. Housing 76 is comprised of a first side 76a and a second side 76b. Second side 76b defines a plurality of holes 76c and 76d therein. Fasteners 76e are insertable through holes 76c and into engagement with threaded bores 76e defined in first side 76a. Fasteners 76e secure first and second sides 76a, 76b to each other, capturing buckling mechanism 78 between them. As best seen in FIG. 13, when first and second sides 76a, 76b capture buckling mechanism 78, an opening 76g is defined between buckling mechanism 78 and second side 76b.

A tether connector 76h is provided on housing 76. Tether connector 76h may be integral with one or the other of the first and second sides 76a, 76b of housing 76. Tether connector 76h defines a slot 76j therein and through which a tether (not shown) may be threaded to secure housing 76 to the frame of the vehicle.

As shown in FIG. 12, buckling mechanism 78 may include one or more tabs 78a that extend horizontally outwardly therefrom approximately midway along the length of the body of buckling assembly 78. Housing 76 and buckling mechanism 78 are known in the prior art and will therefore not be further described herein. The opening 76g defined between buckling mechanism 78 and second side 76b is configured to receive locking tongue 48 of seatbelt 24 therein and buckling mechanism 78 engages locking tongue 48 and secures the same within buckle assembly 18.

Figure 16:
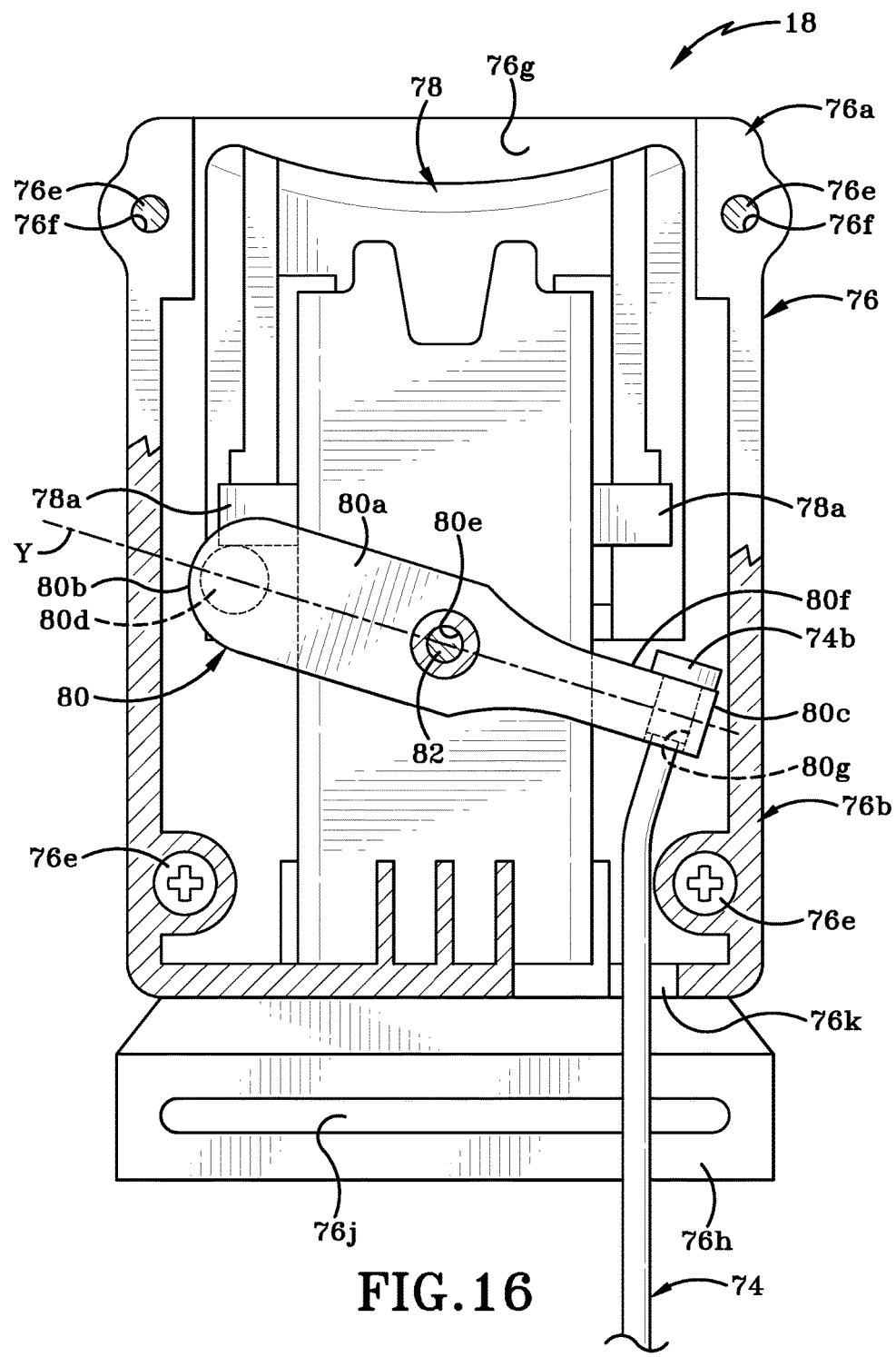
FIG. 16 is a longitudinal cross-section of the buckle assembly taken along line 16-16 of FIG. 13 shown prior to engagement of the seatbelt tongue with the buckle assembly.

In accordance with an aspect of the present invention, buckle assembly 18 may further include a lever arm 80 (FIG. 12) that engages a second end 74b of cable 74. Lever arm 80 includes a base 80a having a first end 80b and a second end 80c. First end 80b may be convexly curved and second end 80c may be substantially planar. A longitudinal axis of base 80a extends between first end 80b and second end 80c and is identified in FIG. 16 by the reference character "Y". A peg 80d extends outwardly from proximate first end 80b of base 80a. Peg 80d may be oriented at right angles to longitudinal axis "Y" of base 80a. A countersunk hole 80e may be provided in base 80a approximately midway along the base's length, i.e., approximately midway between first end 80b and second end 80c. A landing region 80f may be provided on an upper surface of base 80a proximate second end 80c. Landing region 80f defines a hole 80g therein. Hole 80g extends from an upper surface of landing region 80f to a lower surface of base 80a. Second end 74b of cable 74 is received in this hole 80g thereby securing cable 74 to lever arm 80. Second end 74b prevents cable 74 from being pulled through hole 80g and out of engagement with lever arm 80. Cable 74 extends out of an aperture 76k defined in a bottom wall of one or both sides 76a, 76b of housing 76. Lever arm 80 is secured to second side 76b of housing by inserting a fastener 82 through hole 76d defined in second side 76b. Fastener 82 acts as a pivot pin for lever arm 80 as will be described further herein.

Seatbelt system 14 is used in the following manner. The user will position child seat 12 on vehicle seat 10 as illustrated in FIG. 1. As indicated earlier herein, locking tongue 48 is provided on seatbelt webbing 46 and this locking tongue 48 is pulled in the direction of arrow "A" out of seatbelt assembly 16 (FIGS. 1, 2 and 15). This motion in the direction "A" causes webbing 46 to be unwound from spool 42, thereby rotating spool 42 as indicated by arrows "C" in FIG. 15. The webbing 46 is redirected by flange 50 on the vehicle pillar "P" and is moved downwardly and through seatbelt channel 12c on child seat 12 (FIG. 1) and then locking tongue 48 is engaged with buckle assembly 18. It should be noted that with the system 14 disclosed herein, there is no requirement to pull substantially the entire webbing 46 out of seatbelt housing 40 in order to activate the locking retractor mechanism as was necessary in the past. The user is able to pull out only as much webbing as they need to engage locking tongue 48 in buckle assembly 18. Furthermore, because the system will not lock up at this stage, the user can move more freely while they try to engage locking tongue 48 in buckle assembly 18 than was the case in the past. In previously known systems, the seatbelt would readily lock up during the installation process and so the user's movements would need to be relatively slow and deliberate. Frequently, in past systems, the seatbelt would have to be fed all the way back into the seatbelt housing in order to deal with a locked-up seatbelt (i.e. one that would not allow any additional webbing to be fed out of the seatbelt housing.)

Figure 17:
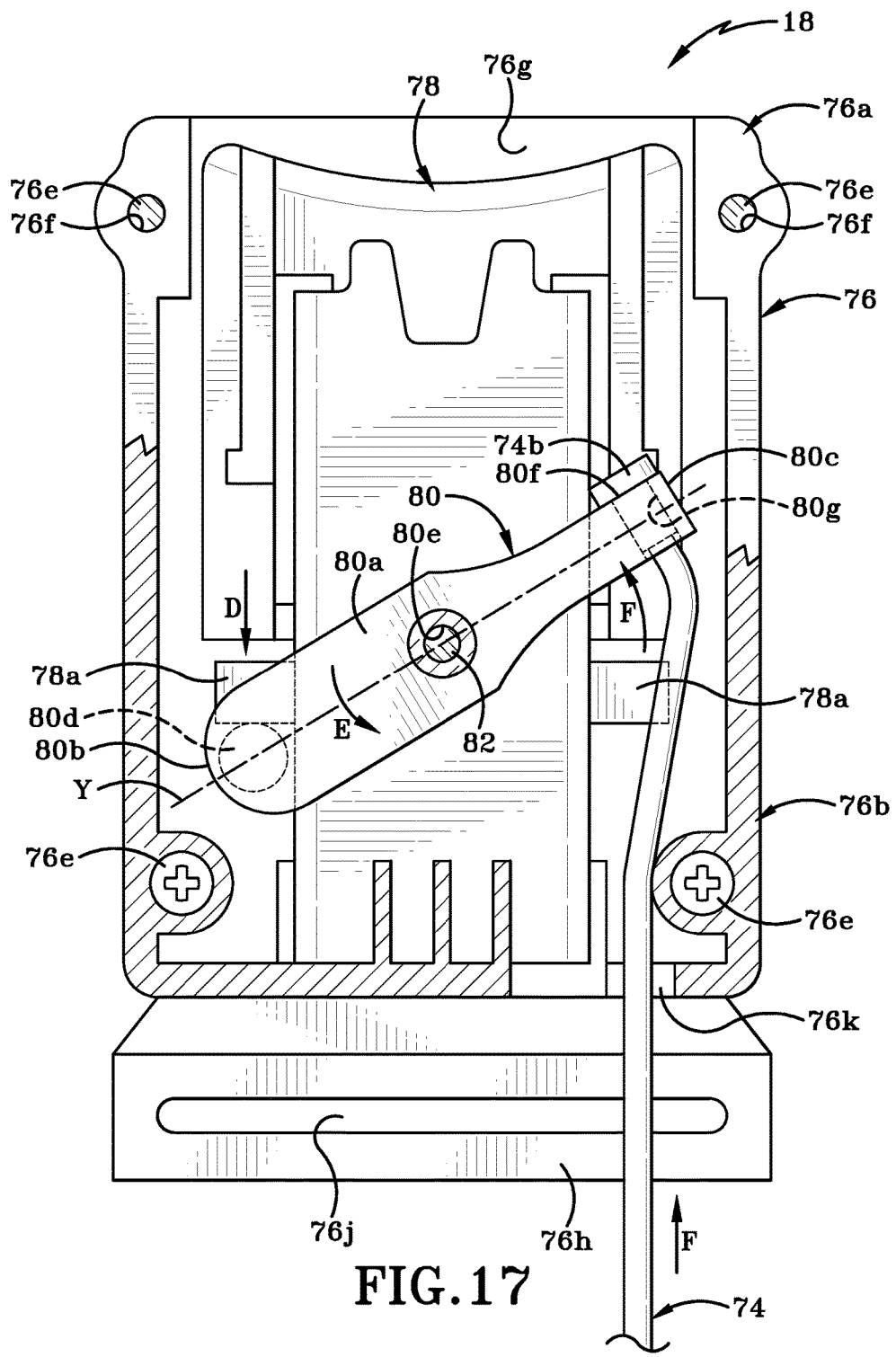
FIG. 17 is a longitudinal cross-section of the buckle assembly taken along line 16-16 of FIG. 13 shown after engagement of the seatbelt tongue with the buckle assembly but with the tongue not shown for clarity of illustration.

With seatbelt system 14, when locking tongue 48 is inserted into opening 76g (FIG. 13) of buckle assembly 18 it engages buckling mechanism 78 and drives a portion of that mechanism (which includes tabs 78a) downwardly within housing 76 in the direction of arrow "D" (FIG. 17). One of tabs 78a is in contact with peg 80d on lever arm 80. Movement of tabs 78a in the direction of arrow "D" causes a similar movement in peg 80d from the position shown in FIG. 16 to the position shown in FIG. 17. Since lever arm 80 is mounted for pivotal motion about fastener 82, as peg 80d is moved in the direction "D" lever arm 80 is caused to pivot about fastener 82 in the direction indicated by arrow "E" (FIG. 17). The pivoting of lever arm 80 pulls second end 74b upwardly in the direction of arrow "F" (FIG. 17) and this motion, in turn, causes cable 74 to be pulled in the direction of arrow "F". The motion in the direction "F" is transmitted along the length of cable 74. Cable 74 may be a bike brake style cable which is housed in a sheath (not shown). The sheath may be affixed at the ends (and typically along the way as well) so that pulling second end 74b of cable 74 does not simply shorten the cable path in the middle.

FIG. 14 shows the position of the locking mechanism (plunger 66, slider 68 and cable fastener 70) in a locked condition prior to engagement of the locking tongue 48 with buckle assembly 18. In this locked condition, spring 72 is in an uncompressed state and, consequently, spring 72 urges cable fastener 70 and therefore slider 68 away from front wall 64e of housing 64 and thereby away from front wall 20a of housing 20. It will be noted that shaft 66a of plunger 66 is received through longitudinal slot 68d (FIG. 11) of slider 68 but hook member 68e of slider 68 is not engaged so as to lock plunger 66 to slider 68. This means that plunger 66 is free to move relative to slider 68. FIG. 14 also shows that third plate 66d on plunger 66 is positioned so that the second end 56d of lever arm 56 of retractor mechanism 26 rests on an upper surface of third plate 66d. In this position, lever arm 56 does not contact pawl mechanism 52. Because lever arm 56 is separated from foot 52b of pawl mechanism 52, pawl 52c is disengaged from teeth 44a of ratchet wheel 44. Consequently, rotational motion of ratchet wheel 44 and therefore of spool 42 cannot be checked. (It should be understood that the ELR system provided on ratchet wheel 44 is not illustrated in the attached figures. It should further be understood that the ELR system is provided and will immediately stop rotation of the ratchet wheel 44 and therefore the spool 42 in the event that the vehicle comes to a sudden stop or is involved in a collision.) Furthermore, because pawl 52c is disengaged from ratchet wheel 44, webbing 46 may be freely withdrawn from spool 42 and thus rotating spool 42 in the direction "A" (FIG. 15). If the pulling force on the webbing 46 is stopped and the webbing 46 is released, the torsion spring that is provided on spool 42 will cause the webbing 46 to be wound back onto spool 42.

Figure 19:
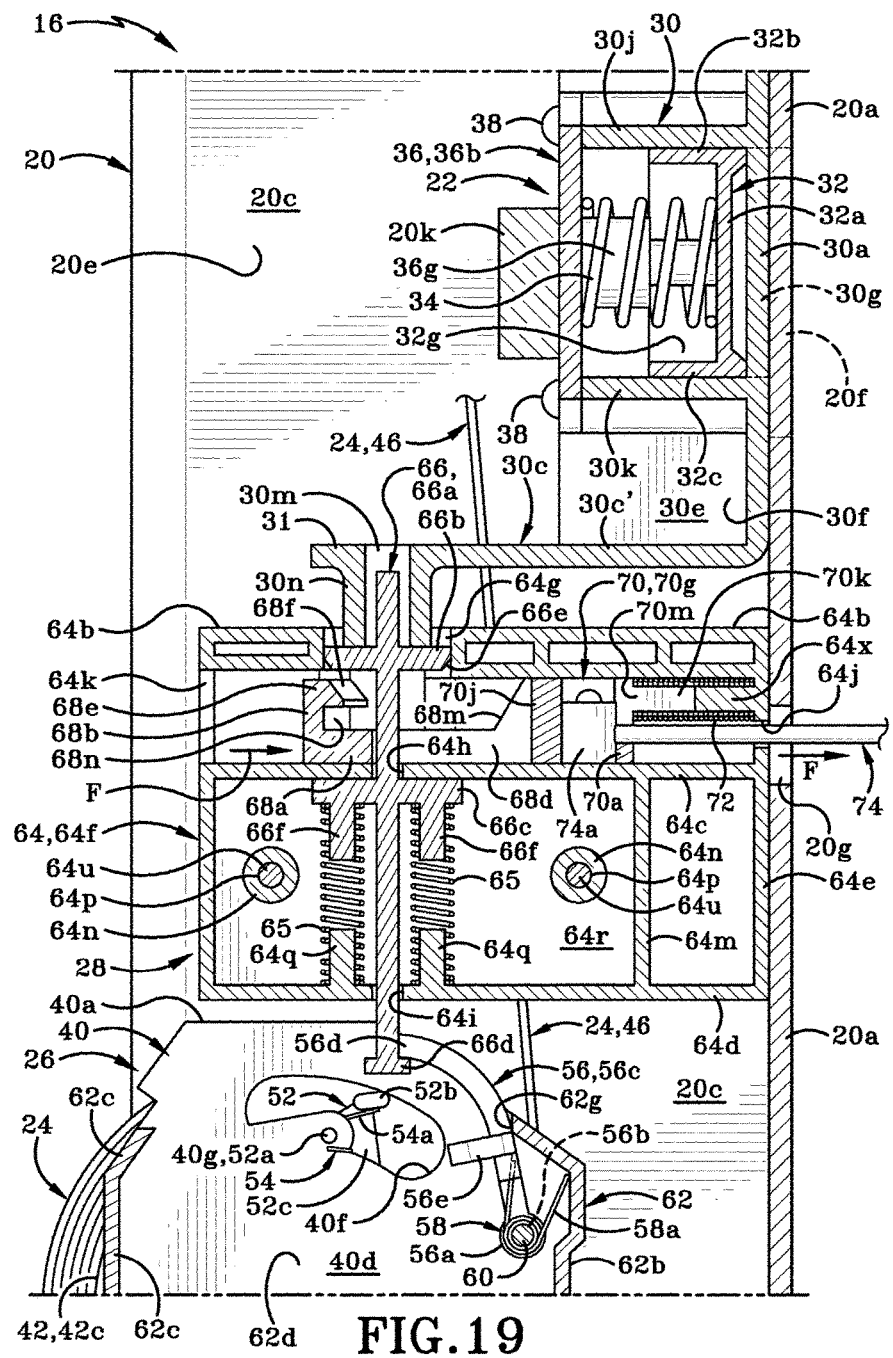
FIG. 19 is a cross-section of the seatbelt assembly taken along line 14-14 of FIG. 6 showing the retractor mechanism in an unlocked position and the locking mechanism in an unlocked position.

When, however, locking tongue 48 is engaged in buckle assembly 18, as has been discussed above, cable 74 is pulled in the direction of arrow "F" and this pulling motion is transmitted along the length of cable 74 to the first end 74a thereof (FIG. 19). Since first end 74a of cable is secured to cable fastener 70, when cable 74 is pulled in the direction "F", that pulling motion is transmitted to cable fastener 70 which is then also moved in the direction of arrow "F". Since slider 68 is interlocked with cable fastener 70 via projection 70j, the motion of cable fastener 70 in the direction of arrow "F" is also transmitted to slider 68. Slider 68 and cable fastener 70 are thus moved from the position shown in FIG. 14 to the position shown in FIG. 19. FIG. 19 shows coil spring 72 compressed between end the interior surface of front wall 64e of housing 64 and cable fastener 70. FIG. 19 also shows slider 68 moved inwardly and away from rear wall 64f of housing 64.

It should be noted that, at this point, plunger 66 is still in its original position (seen in FIG. 14) and thus second end 56d of lever arm 56 is still being held by third plate 66d of plunger 66 in a position where lever arm 56 does not contact foot 52b of pawl mechanism 52. Thus, pawl 52c remains in a position where it does not and cannot engage ratchet wheel 44. Seatbelt system 14 may be used in this condition to secure a person on seat 10 without the risk that the webbing 46 will accidentally become locked in place as the person leans forward and then sits back. In other words, webbing 46 cannot be cinched when the various components of seatbelt system 14 are in the position illustrated in FIG. 19. If a user were to place a child seat 12 on seat 10 when seatbelt system 14 is in the condition illustrated in FIG. 19 and then thread webbing 46 through seatbelt channel 12c and engage locking tongue 48 in buckle assembly 18, the user would be completely unable to cinch or tighten webbing 46 to a sufficient degree to tightly retain child seat 12 on seat 10. In other words, no matter how much the user pulled on webbing 46 in the opposite direction to arrow "A" (FIG. 2) in order to wind the webbing 46 back onto spool 42 and then try to pull the webbing 46 outwardly again in the direction "A" to engage the retractor mechanism, the spool 42 cannot be locked against further rotation. Thus, if the user tries to wiggle the child seat 12 around to see if the child seat 12 is tightly retained against seat 10, the child seat 12 will be able to be pulled away from seat 10 and be easily rocked from side-to-side. It will therefore be obvious to the user that they have not taken the next step to engage the locking retractor mechanism. That next step is to activate the control mechanism.

Figure 18:
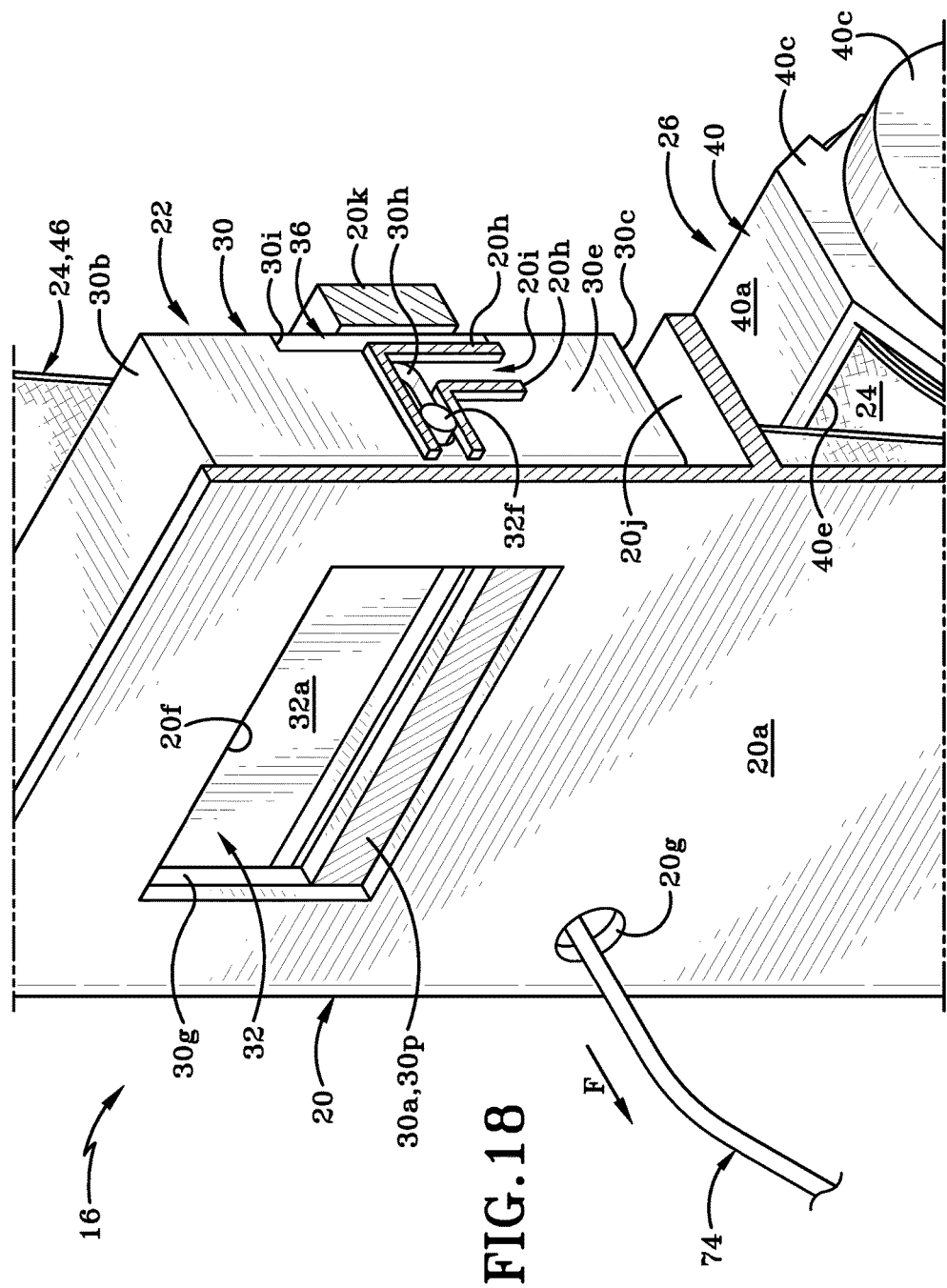
FIG. 18 is front isometric perspective view of the seatbelt assembly with the right side wall of the housing removed for clarity of illustration but showing the guide tracks that are provided on the housing engaged with the actuator assembly.
Figure 20:
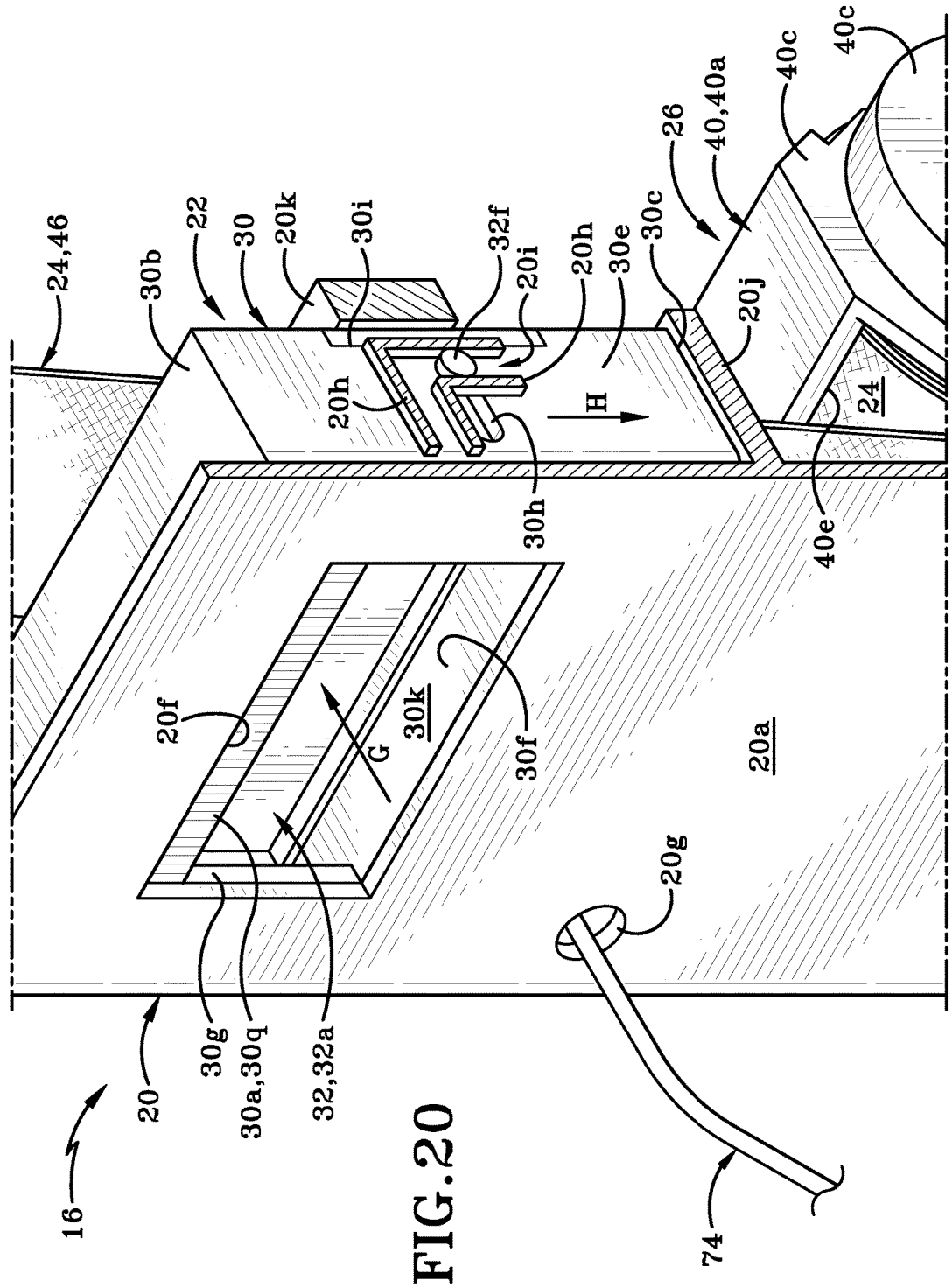
FIG. 20 is front isometric perspective view of the seatbelt assembly with the right side wall of the housing removed for clarity of illustration but showing the guide tracks provided on the housing engaged with the actuator assembly and showing the actuator assembly moved to a locked position.
Figure 21:
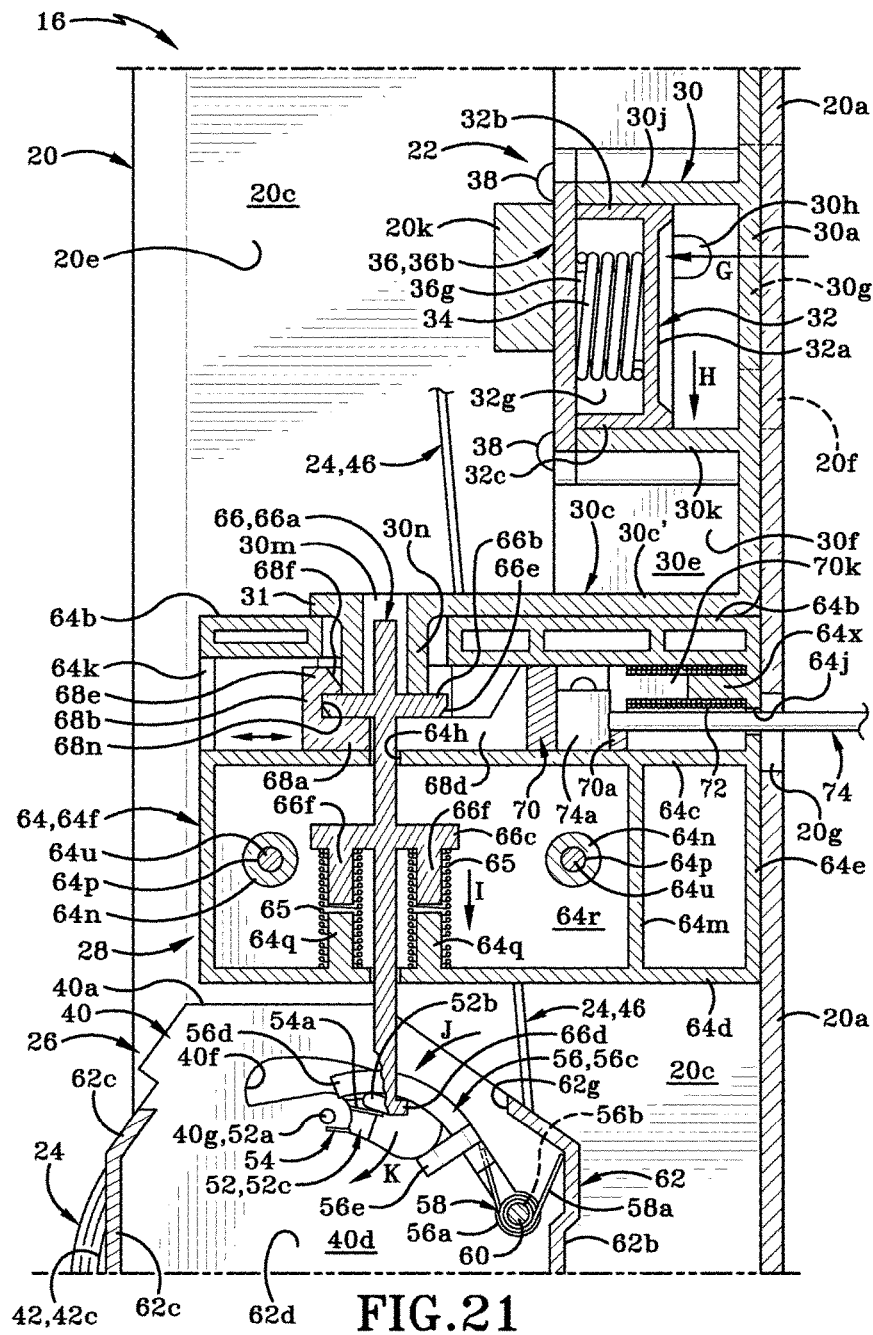
FIG. 21 is a cross-section of the seatbelt assembly taken along line 14-14 of FIG. 6 showing the retractor mechanism in a locked position and the locking mechanism in a locked position.

In order to cinch webbing 46, i.e., in order to stop webbing 46 from being able to be pulled out of housing 40 in the direction of arrow "A", the user needs to actively and purposefully engage the control mechanism that is linked to the retractor mechanism on spool 42. Engaging the control mechanism, i.e., engaging actuator assembly 22, can only occur after the user has engaged locking tongue 48 in buckle assembly 18 and all of the components of the locking mechanism (slider 68 and cable fastener 70) are in the condition shown in FIG. 19. Actuator assembly 22 is engaged by pushing button 32 (FIGS. 1 and 21) inwardly in the direction of arrow "G" (FIG. 21) and downwardly in the direction of arrow "H". This motion will cause posts 32f to slide horizontally (in the direction of arrow "G" shown in FIG. 20) and then vertically downwardly in guide path 20i (in the direction of arrow "H"). As button 32 is pushed inwardly and downwardly in this manner, springs 34 are compressed. This is shown in FIG. 21. Additionally, the inward and downward motion causes the entire actuator housing 30 to move downwardly in the direction of arrow "H" from the position shown in FIG. 18 to the position shown in FIG. 20. Button 32 cannot return to its original position once aperture 30g of actuator housing 30 moves out of alignment with aperture 20f in front wall 20a of housing 20. It should also be noted that when actuator housing 30 is in the first position (FIG. 18) the first visual indicator 30p is visible to the user. The second visual indicator 30q cannot be seen when the button is undepressed. The presence of this visual indicator 30p in a location that is viewable to the user may be used to verify that the control mechanism has not yet been engaged. Once button 32 is pushed inwardly and downwardly to the position shown in FIG. 20, the second visual indicator 30q is visible to the user (while the first visual indicator 30p has become hidden and therefore cannot be seen). The second visual indicator 30q helps the user verify that the control mechanism has been actuated.

The movement of actuator housing 30 in the direction of arrow "H" also causes a bottom end of projection 30n on actuator housing 30 to push downwardly on first plate 66b of plunger 66. This motion moves plunger 66 in the direction of arrow "I" (FIG. 21), compressing coil springs 65 as it does so. As plunger 66 moves downwardly, the chamfered surface 66e on first plate 66b slides downwardly along the surface 68f of slider 68. This moves slider 68 slightly in the direction of arrow "F" thereby permitting first plate 66b to move downwardly and past an innermost edge of curved surface 68f of slider and into a slot 68n defined between an interior surface of hook member 68e and upper surface of base 68a. First plate 66b slides inwardly into slot 68n to a sufficient degree that the lower surface of first plate 66b moves into contact with the upper surface of base 68a of slider 68. As the first plate 66b clears the lowermost edge of hook member 68e, slider 68 will move slightly back in the opposite direction to arrow "F". Hook member 68e will thus lock slider 68 to plunger 66 and further movement of plunger 66 in the opposite direction to arrow "I" will be prevented. FIG. 21 shows plunger 66 and slider 68 locked together.

As plunger 66 moves downwardly in the direction of arrow "I", the third plate 66d thereof also moves downwardly in the direction of arrow "I". This movement of third plate 66d allows lever arm 56 to rotate in the direction indicated by arrow "J" (FIG. 21) as spring 58 returns to an uncompressed position. The rotational motion of lever arm 56 brings the second end 56d thereof into a position where second end 56d pushes downwardly on foot 52b of pawl mechanism 52. Foot 52b and thereby pawl 52c are caused to rotate in the direction of arrow "K" (FIGS. 21 and 22). Pawl 52c becomes wedged between two teeth 44a on ratchet wheel 44 thus preventing any rotational motion of ratchet wheel 44 in a direction that will allow webbing 46 to be pulled out of seatbelt assembly 16 in the direction of arrow "A" (FIG. 2). Ratchet wheel 44 and therefore spool 42 can therefore no longer rotate freely in a counter-clockwise direction as this motion is prevented by pawl 52c. It is possible, however, for spool 42 and ratchet wheel 44 to still be rotated in a clockwise direction as this motion is not prevented by pawl 52c. So, a user is able to cinch webbing 46 tightly in order to secure child seat 12 in place on seat 10. This is made possible because as the user feeds webbing 46 back onto spool 42 (in the opposite direction to arrow "A") and each time they let go of the webbing the interaction between pawl 52c and ratchet wheel 44 locks the spool 42 and therefore the webbing 46 in place.

When it is later desired to release the child seat 12 from vehicle seat 10, the user simply unbuckles locking tongue 48 from buckle assembly 18. This is accomplished by pushing downwardly on buckling mechanism 78 as would customarily be done to disengage a seatbelt. Buckling mechanism 78 will return from the position illustrated in FIG. 17 to the position illustrated in FIG. 16. As lever arm 80 rotates back to its original position, the pulling motion "F" on cable 74 is released. At the seatbelt assembly 16, since the motion "F" on cable 74 is no longer applied, coil spring 72 returns to its original size and position. This expansion of coil spring 72 causes cable fastener 70 and thereby slider 68 to move in the opposite direction to arrow "F" from the position shown in FIG. 23 to the position shown in FIG. 14. Hook member 68e on slider 68 is moved rearwardly towards rear wall 64e of housing 68d thereby disengaging from first plate 66b on plunger 66. Coil springs 65 are thereby freed to return to their original size and position. The expansion of coil springs 65 causes plunger 66 is to move upwardly in the opposite direction to arrow "I". The third plate 66d on the upwardly moving plunger 66 causes the second end 56d of lever arm 56 to be moved upwardly with it, thus rotating lever arm 56 in the opposite direction to arrow "J" (FIG. 21); compressing spring 58 as lever arm 56 rotates. Spring 54 on pawl mechanism 52 thus returns to its uncompressed state and as it does so pawl 52c is rotated in the opposite direction to arrow "K" (FIG. 21). Pawl 52c is thereby disengaged from teeth 44a of ratchet wheel 44. The motion of ratchet wheel 44 thus can no longer be stopped by pawl 52c and so cinching of webbing 46 is no longer possible. Webbing 46 may thus be pulled out of housing 40 or fed back into the same at will.

It should be noted that as plunger 66 is moved upwardly in the opposite direction to arrow "I" as coil springs 65 return to their original position, the upper surface of first plate 66b on plunger contacts the underside of projection 30n on actuator housing 30. The upward motion of plunger 66 moves projection 30n and thereby the entire actuator housing 30 vertically in the opposite direction to arrow "H". As soon as apertures 30g and 20f align once again, coil springs 34 return to their original size and shape and button 32 is forced horizontally forwardly by springs 34 in the opposite direction to arrow "G". Button 32 is therefore moved back into a position where front surface 32a of button 32 is in close proximity to the interior surface of front wall 30a of actuator housing 30.

It should be noted that actuator assembly 22 cannot be engaged without locking tongue 48 first being engaged with buckle assembly 18. This is because (as illustrated in FIG. 14) slider 68 is not in the correct position to lock onto first plate 66a of plunger 66 until cable 74 has pulled cable connector 70 and thereby slider 68 from the position shown in FIG. 14 to the position shown in FIG. 19. So, even if a user pushes button 32, first plate 66a on plunger 66 will contact the upper surfaces of the second wall 68c of slider 68 and top wall 70c of cable connector 70 and therefore be prevented from moving downwardly in the direction of arrow "I".

It is contemplated that, instead of having manual components such as cable 74 and button 32, seatbelt assembly 14 may be provided with sensors in one, more or all of buckle assembly 18, actuator assembly 22, locking tongue 48, lever arm 56, and locking mechanism (68/66). Seatbelt assembly 16 may also be provided with a central processing unit (CPU) that will monitor and control these sensors and provided programming that is able move, lock and unlock various components in the same manner as has been manually described above. It is further contemplated that, when activated, these electronic components may be able to initiate movement of slider 68 and plunger 66 so as to engage pawl 52c or disengage pawl as needed. So, for example, if such electronic components are provided, then sensors in buckle assembly 18 may send a signal to actuator assembly 22 on seatbelt assembly 16 when locking tongue 48 is engaged in buckle assembly 18. As with the manual system, the retractor mechanism will remain disengaged unless and until the user presses button 32 on seatbelt assembly 16. When button 32 on actuator assembly 22 is depressed, a signal may be sent to the CPU and then the CPU will control movement of the slider 68 and plunger 66 to rotate pawl 52c into engagement with ratchet wheel 44. Cinching of webbing 46 may then be possible.

When locking tongue 48 is disengaged from buckle assembly 18, that information will be transmitted to CPU which will control them movement of slider 68 and plunger 66 and break the engagement of pawl 52c from ratchet wheel 44. Cinching of webbing 46 will then no longer be possible. The CPU may include programming that not only controls all of these functions but also helps to determine whether or not all components are engaged and functioning properly and whether or not child seat 12 is properly and adequately engaged on seat 10.

Still further, the system may be set up to have a control mechanism that electronically transmits a signal directly to pawl 52c to rotate pawl 52c from a first position of engagement with ratchet wheel 44 so that the wheel's rotation is prevented in one direction but allowed in an opposite direction; to a second position where pawl 52c does not interfere with the rotation of ratchet wheel 44 in either direction. Still further, CPU could include programming that directly controls the ratchet wheel's rotation and selectively is activated to rotate ratchet wheel 44 in only one direction instead of rotating selectively in one of two opposite directions.

In each of these instances, whether manual or electronic, some type of control mechanism (such as button 32) is required to be activated after engaging locking tongue 48 in buckle assembly but before cinching of webbing 46. Applicant contemplates that in the future sensors could be placed in a child seat 12 and in the vehicle seat 10 and the act of the user simply placing the child seat 12 on the seat 10 could be the additional control mechanism that instructs the CPU to switch on the locking retractor mechanism after verification that the locking tongue 48 has been engaged in the buckle assembly 18.

It is further contemplated that the manual and electronic versions of the seatbelt system 14 described above will not interfere in any way with any ELR system provided to engage the retractor mechanism in the case of an emergency stop of the vehicle.

It will be understood that the seatbelt system 14 may also be used in instances where there is a removable seat. The system 14 may include components that ensure automatic reconnection when the removable seat is re-engaged in the vehicle. This is particularly true if various operations of the system are electronic instead of manual but even manual components of system 14 can be set up to re-engage automatically.

It will be understood that while button 32 is disclosed herein as requiring to be manually pushed inwardly and downwardly through aligned apertures 20f, 30g, a touch screen may be used to actuate an electronic version of the button. Alternatively, button 32 may act in a different fashion. For example, two spaced apart button sections may need to be pinched together or pushed toward each other or away from each other to activate the plunger 66. Alternatively, button 32 may be replaced with a lever type mechanism that is linked to plunger 66 and may be used to raise or lower this plunger 66.

It will further be understood that some of the features disclosed herein may be utilized in currently known ALR systems where the webbing has to be entirely pulled out of the seatbelt housing in order to activate the ALR. Those features include providing a modified ALR system where the locking tongue on the seatbelt would have to be engaged in the buckle assembly before the ALR would be activated.

It will further be understood that the presently disclosed system could omit the feature of requiring the locking tongue to be buckled in the buckle assembly prior to engaging button 32 of the control mechanism. So, in this instance, the user may be able to have direct cinching control by simply engaging the button to turn on the cinching function. Resetting the button to the original state or activating a second actuator would reset or turn off cinching control, irrespective of how much webbing is pulled out of the seatbelt housing.

Previously known retractor mechanisms have included ratchet wheels and pawls but none of the previously known systems have included a lever arm such as lever arm 56 that pivots to engage pawl 52c and move it into contact with the ratchet wheel's teeth 44a. Furthermore, no previously known systems have included a lever arm 56 that can only be moved into contact with the ratchet wheel's teeth 44a after engaging the locking tongue 48 on seatbelt 24 with the buckle assembly 18. Still further, no previously known systems have included a control mechanism (actuator assembly 22) that is moved to a condition to engage and permit movement of the lever arm 56 only after the locking tongue 48 on seatbelt 24 is engaged with buckle assembly 18.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration set out herein are an example and the invention is not limited to the exact details shown or described.

The invention claimed is:

1. A seatbelt system comprising:
a buckle assembly;
a spool;

a length of webbing having a first end engaged with the spool and a locking tongue provided on the webbing; wherein the locking tongue is selectively engageable in the buckle assembly;

a ratchet wheel operatively engaged with the spool, said ratchet wheel and spool being selectively rotatable in unison about an axis in a first direction to wind the webbing onto the spool and in a second direction to wind the webbing off of the spool;

a pawl configured to stop rotation of the ratchet wheel and thereby to stop rotation of the spool in one direction; and a control mechanism operatively engaged with the pawl, said control mechanism being movable between a first condition and a second condition; and when the control mechanism is in the first condition the pawl is disengaged from the ratchet wheel and the ratchet wheel and spool are rotatable in either of the first and second directions; and when the control mechanism is in the second condition the pawl is moved into engagement with the ratchet wheel and the ratchet wheel and spool are only able to rotate in the first direction;

wherein the control mechanism includes:

an actuator assembly that engages the pawl and moves the pawl into engagement with the ratchet wheel only after the locking tongue on the webbing is interlockingly engaged with the buckle assembly; and a cable extending between the buckle assembly and the actuator assembly; and when the locking tongue is engaged with the buckle assembly the cable is pulled in a direction away from the actuator assembly; and wherein the actuator assembly includes:

a slider that is operatively engaged with the cable; and when the cable is pulled in the direction away from the actuator assembly, the slider is caused to move into a lockable position; and a plunger that is selectively movable into contact with the pawl or selectively movable out of contact with the pawl; and wherein the slider locks the plunger in contact with the pawl after the cable has been pulled by engaging the locking tongue in the buckle assembly.

2. The seatbelt system as defined in claim 1, wherein the actuator assembly includes:

a lever arm that is pivotable in a first direction to cause the pawl to move into contact with the ratchet wheel; and is pivotable in a second direction to allow the pawl to move out of contact with the ratchet wheel.

3. The seatbelt system as defined in claim 2, wherein the plunger is selectively movable into contact with the lever arm to cause the lever arm to pivot in the first direction; and wherein the plunger is selectively movable out of contact with the lever arm to cause the lever arm to pivot in the second direction.

4. The seatbelt system as defined in claim 3, wherein the actuator assembly further includes:

a button operatively engageable with the plunger and wherein the button is contacted by the user to cause the plunger to move into contact with the lever arm.

5. The seatbelt system as defined in claim 4, further comprising at least one post provided on the button and a guide path provided on a seatbelt housing; and wherein the at least one post is received in the guide path and is movable therealong when the button is contacted by the user.

6. The seatbelt system as defined in claim 5, wherein the guide path includes a horizontally oriented section and a vertically oriented section connected to the horizontally oriented section; and wherein the button is pushed inwardly and travels along the horizontally oriented section and the button is then pushed downwardly and travels along the vertically oriented section.

7. The seatbelt system as defined in claim 1, wherein the seatbelt system is operable in a first mode where cinching of the webbing is not possible or is operable in a second mode where cinching of the webbing is possible; and wherein the seatbelt system is moved from the first mode to the second mode by activating the control mechanism; and the seatbelt system is moved from the second mode to the first mode by disengaging the control mechanism.

8. The seatbelt system as defined in claim 1, wherein the control mechanism is an electronic system including a central processing unit (CPU) and a plurality of sensors provided in one or more of the buckle assembly, locking tongue, spool, ratchet wheel or pawl.

9. The seatbelt system as defined in claim 1, wherein the plunger is operatively engaged with the pawl via a lever arm; and wherein movement in the plunger and lever arm is activated by depressing a button on a seatbelt housing inwardly and downwardly or by pinching two spaced apart button sections on the seatbelt housing toward each other or by moving a lever type mechanism to raise or lower the plunger.

10. A method of securing a child seat to a vehicle seat using a seatbelt mounted for rotation on a spool; said method comprising:

providing a seatbelt assembly that includes a buckle assembly, a spool, and a length of seatbelt webbing connected at a first end to the spool, a locking tongue provided on the webbing, wherein the locking tongue is selectively engageable in the buckle assembly; where the spool is rotatable about an axis in a first direction to wind the webbing on the spool and is rotatable in a second direction to wind the webbing off of the spool;

providing a ratchet wheel; operatively engaged with the spool, said ratchet wheel and spool being selectively rotatable in unison about an axis in a first direction to wind the webbing onto the spool and in a second direction to wind the webbing off of the spool;

providing a pawl proximate the ratchet wheel;

configuring the pawl to stop rotation of the ratchet wheel and thereby to stop rotation of the spool in one direction;

operatively engaging a control mechanism with the pawl, said control mechanism being movable between a first condition and a second condition; and when the control mechanism is in the first condition, the pawl is disengaged from the ratchet wheel and the ratchet wheel and spool are rotatable in either of the first and second directions; and when the control mechanism is in the second condition, the pawl is moved into engagement with the ratchet wheel and the ratchet wheel and spool are only able to rotate in the first direction;

wherein the control mechanism includes:

an actuator assembly that engages the pawl and moves the pawl into engagement with the ratchet wheel only after the locking tongue on the webbing is interlockingly engaged with the buckle assembly; and a cable extending between the buckle assembly and the actuator assembly; and when the locking tongue is engaged with the buckle assembly, the cable is pulled in a direction away from the actuator assembly; and wherein the actuator assembly includes:
a slider operatively engaged with the cable; and when the cable is pulled in the direction away from the actuator assembly, the slider is caused to move into a lockable position; and
a plunger selectively movable into contact with the pawl or selectively movable out of contact with the pawl; and wherein the slider locks the plunger in contact with the pawl after the cable has been pulled by engaging the locking tongue in the buckle assembly;

actuating the control mechanism by:
moving the slider within a seatbelt housing from a first position to a second position;
moving the plunger through a portion of the slider when the slider has been moved to the second position; and
contacting the pawl with the plunger;
moving the pawl into engagement between two teeth on the ratchet wheel; and
stopping, with the pawl, rotation of the ratchet wheel in the second direction while permitting rotation of the ratchet wheel in the first direction.

11. The method as defined in claim 10, wherein the step of moving the plunger includes depressing a button provided on the seatbelt housing.

12. The method as defined in claim 10, wherein the step of moving the slider is preceded by inserting the locking tongue provided on the webbing into the buckle assembly provided on the vehicle.

13. The method as defined in claim 12, wherein the insertion of the locking tongue into the buckle assembly causes the cable extending between the buckle assembly and the seatbelt housing to be pulled in a first direction and the step of pulling of the cable causes the slider to move from the first position to the second position.

14. The method as defined in claim 10, wherein the control mechanism is an electronic control mechanism and the method further comprises:
providing the electronic control mechanism with a central processing unit (CPU) and providing a plurality of sensors in one or more of the buckle assembly, locking tongue, spool, ratchet wheel and pawl; and wherein the method further includes transmitting signals between the one or more of the CPU, the buckle assembly, the locking tongue, the spool, the ratchet wheel and the pawl to cause the pawl to move into engagement with the ratchet wheel or to cause the pawl to move out of engagement with the ratchet wheel.

15. The method as defined in claim 10, further comprising:
selecting one of a first mode and a second mode with which to use the seatbelt assembly, where the first mode does not permit cinching of the seatbelt webbing and the second mode does permit cinching of the seatbelt webbing.

16. The method as defined in claim 15, wherein the step of selecting the first mode includes engaging the locking tongue on the seatbelt webbing in the buckle assembly.

17. The method as defined in claim 16, wherein the step of selecting the second mode includes engaging the locking tongue in the buckle assembly followed by engaging the control mechanism to move the pawl into contact with the ratchet wheel and stopping rotation of the ratchet wheel and thereby the spool with the pawl.

18. The method as defined in claim 17, further comprising the step of stopping use of the seatbelt assembly in the selected one of the first mode and the second mode by disengaging the locking tongue from the buckle assembly.

19. A seatbelt system comprising:
a buckle assembly;
a spool mounted for rotation within a housing;
a length of webbing having a first end engaged with the spool and a locking tongue provided on the webbing; wherein the locking tongue is selectively engageable in the buckle assembly;
a ratchet wheel provided on the spool; wherein the spool is selectively rotatable about an axis in a first direction to wind the webbing onto the spool and in a second direction to wind the webbing off of the spool;
a pawl configured to selectively engage the ratchet wheel to stop rotation of the spool in the second direction;
a plunger selectively movable into contact with the pawl to stop rotation of the spool in the second direction; and
a slider provided within the housing; said slider being selectively movable between a first position and a second position within the housing; and wherein the plunger is movable relative to the slider; and when the slider is in the second position, the plunger is movable into contact with the pawl and the pawl is movable into contact with the ratchet wheel to stop rotation of the spool in the second direction.

* * * * *